US012792327B2

(12) United States Patent
Suh et al.

(10) Patent No.: US 12,792,327 B2
(45) Date of Patent: Nov. 10, 2026

(54) PLACEMENT METHOD BASED ON A SORTED OPERATION UNIT GRAPH FOR AN ITERATIVE PLACEMENT AND ROUTING ON A RECONFIGURABLE PROCESSOR

(71) Applicant: SambaNova Systems, Inc., Palo Alto, CA (US)

(72) Inventors: Hong Suh, Palo Alto, CA (US); Sumti Jairath, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 588 days.

(21) Appl. No.: 18/225,865

(22) Filed: Jul. 25, 2023

(65) Prior Publication Data

US 2024/0036871 A1 Feb. 1, 2024

Related U.S. Application Data

(60) Provisional application No. 63/392,368, filed on Jul. 26, 2022, provisional application No. 63/392,364, (Continued)

(51) Int. Cl.
*G06F 8/41* (2018.01)
*G06F 9/50* (2006.01)
(Continued)

(52) U.S. Cl.
CPC .............. *G06F 8/451* (2013.01); *G06F 8/457* (2013.01); *G06F 9/5066* (2013.01); *G06F 15/7871* (2013.01); *G06F 15/80* (2013.01)

(58) Field of Classification Search
None
See application file for complete search history.

(56) References Cited

U.S. PATENT DOCUMENTS 7,610,573 B1 * 10/2009 Chan ........................ G06F 30/34 716/104
10,872,057 B1 12/2020 Rawat et al.
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Abu Zar Ghaffari
(74) *Attorney, Agent, or Firm* — FP; Joachim Erhard Pistorius; Sikander M. Khan

(57) ABSTRACT

A placer and router for an iterative placement and routing of a sorted operation unit graph on a reconfigurable processor is presented as well as a method of operating a placer and router for an iterative placement and routing of a sorted operation unit graph on a reconfigurable processor. The placer and router is configured to receive an architectural specification of the reconfigurable processor and the sorted operation unit graph having an ordered sequence of nodes and edges that interconnect nodes in the ordered sequence of nodes. The placer and router is further configured to provide an assignment of nodes of the sorted operation unit graph to locations on the reconfigurable processor and an assignment of edges of the sorted operation unit graph to physical links and switches of the reconfigurable processor.

18 Claims, 13 Drawing Sheets

Related U.S. Application Data filed on Jul. 26, 2022, provisional application No. 63/392,374, filed on Jul. 26, 2022.

(51) Int. Cl.

| | |
|---|---|
| ***G06F 15/78*** | (2006.01) |
| ***G06F 15/80*** | (2006.01) |

(56) References Cited

U.S. PATENT DOCUMENTS

| | | | | |
|---|---|---|---|---|
| 11,232,156 | B1 | 1/2022 | Wang et al. | |
| 11,934,887 | B1 | 3/2024 | Wang et al. | |
| 2007/0198971 | A1* | 8/2007 | Dasu | G06F 8/4432 717/140 |
| 2007/0220522 | A1* | 9/2007 | Coene | G06F 30/392 718/104 |
| 2007/0239964 | A1* | 10/2007 | Denault | G06F 15/7867 712/11 |
| 2007/0245272 | A1* | 10/2007 | Rohe | H03K 19/17758 716/134 |
| 2009/0119490 | A1 | 5/2009 | Oh et al. | |
| 2010/0199069 | A1* | 8/2010 | Kim | G06F 9/3838 712/30 |
| 2011/0197048 | A1* | 8/2011 | Chung | G06F 9/5083 712/30 |
| 2012/0204001 | A1* | 8/2012 | Egger | G06F 15/7892 712/15 |
| 2013/0125097 | A1* | 5/2013 | Ebcioglu | G06F 8/4452 717/136 |
| 2016/0063171 | A1* | 3/2016 | Tripathi | G06F 30/398 700/121 |
| 2018/0004530 | A1* | 1/2018 | Vorbach | G06F 9/3846 |
| 2018/0165400 | A1 | 6/2018 | Feld et al. | |
| 2018/0167289 | A1 | 6/2018 | Beyer | |
| 2019/0370407 | A1 | 12/2019 | Dickie | |
| 2022/0121928 | A1* | 4/2022 | Dong | G06N 3/04 |
| 2022/0217054 | A1* | 7/2022 | Ying | H04L 41/142 |
| 2022/0222584 | A1 | 7/2022 | Nimmagadda et al. | |
| 2022/0414054 | A1 | 12/2022 | Parra et al. | |
| 2023/0153567 | A1 | 5/2023 | Keski-Valkama | |
| 2023/0297651 | A1 | 9/2023 | Mehta et al. | |
| 2023/0376569 | A1 | 11/2023 | Ushijima-Mwesigwa et al. | |
| 2023/0385641 | A1 | 11/2023 | Farsarakis et al. | |
| 2024/0036871 | A1 | 2/2024 | Suh et al. | |
| 2024/0163171 | A1 | 5/2024 | Bernardo de Oliveira et al. | |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

PLACEMENT METHOD BASED ON A SORTED OPERATION UNIT GRAPH FOR AN ITERATIVE PLACEMENT AND ROUTING ON A RECONFIGURABLE PROCESSOR

RELATED APPLICATIONS AND DOCUMENTS

This application claims the benefit of U.S. Provisional Patent Application No. 63/392,364, entitled, "Sorting the Nodes of an Operation Unit Graph for Implementation in a Reconfigurable Processor" filed on 26 Jul. 2022, the benefit of U.S. Provisional Application No. 63/392,368, entitled, "A Placement Method Based on a Sorted Operation Unit Graph for an Iterative Placement and Routing on a Reconfigurable Processor" filed on 26 Jul. 2022, and the benefit of U.S. Provisional Patent Application No. 63/392,374, entitled, "Routing Method Based on a Sorted Operation Unit Graph for an Iterative Placement and Routing on a Reconfigurable Processor" filed on 26 Jul. 2022. These provisional applications are hereby incorporated by reference for all purposes.

This application also is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"
- U.S. Nonprovisional patent application Ser. No. 16/862,445, now U.S. Pat. No. 11,188,497 B2, filed Nov. 21, 2018, entitled "CONFIGURATION UNLOAD OF A RECONFIGURABLE DATA PROCESSOR;"
- U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"
- U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"
- U.S. Nonprovisional patent application Ser. No. 17/093,543, filed Nov. 9, 2020, entitled "EFFICIENT CONFIGURATION OF A RECONFIGURABLE DATA PROCESSOR;"
- U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"
- U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"
- U.S. Nonprovisional patent application Ser. No. 17/326,128, filed May 20, 2021, entitled "COMPILER FLOW LOGIC FOR RECONFIGURABLE ARCHITECTURES;"
- U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"
- U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"
- U.S. Nonprovisional patent application Ser. No. 17/322,697, filed May 17, 2021, entitled "QUIESCE RECONFIGURABLE DATA PROCESSOR;"
- U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"
- U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"
- U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"
- U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"
- U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"
- U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"
- U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"
- U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"
- U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"
- U.S. Nonprovisional patent application Ser. No. 17/337,080, now U.S. Pat. No. 11,328,209 B1, filed Jun. 2, 2021, entitled "MEMORY EFFICIENT DROPOUT;"
- U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"
- U.S. Nonprovisional patent application Ser. No. 16/890,841, filed Jun. 2, 2020, entitled "ANTI-CONGESTION FLOW CONTROL FOR RECONFIGURABLE PROCESSORS;"
- U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"

U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371,049, filed Jul. 8, 2021, entitled "SYSTEMS AND METHODS FOR A EDITING TOPOLOGY OF RECONFIGURABLE DATA PROCESSOR;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Nonprovisional patent application Ser. No. 16/996,666, filed Aug. 18, 2020, entitled "RUNTIME PATCHING OF CONFIGURATION FILES;"

U.S. Nonprovisional patent application Ser. No. 17/214,768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216,657, now U.S. Pat. No. 11,263,170 B1, filed Mar. 29, 2021, entitled "LOSSLESS TILING IN CONVOLUTION NETWORKS-PADDING BEFORE TILING, LOCATION-BASED TILING, AND ZEROING-OUT;"

U.S. Nonprovisional patent application Ser. No. 17/384,515, filed Jul. 23, 2021, entitled "LOSSLESS TILING IN CONVOLUTION NETWORKS-MATERIALIZATION OF TENSORS;"

U.S. Nonprovisional patent application Ser. No. 17/216,651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216,652, now U.S. Pat. No. 11,227,207 B1, filed Mar. 29, 2021, entitled "LOSSLESS TILING IN CONVOLUTION NETWORKS-SECTION BOUNDARIES;"

U.S. Nonprovisional patent application Ser. No. 17/216,654, now U.S. Pat. No. 11,250,061 B1, filed Mar. 29, 2021, entitled "LOSSLESS TILING IN CONVOLUTION NETWORKS-READ-MODIFY-WRITE IN BACKWARD PASS;"

U.S. Nonprovisional patent application Ser. No. 17/216,655, now U.S. Pat. No. 11,232,360 B1, filed Mar. 29, 2021, entitled "LOSSLESS TILING IN CONVOLUTION NETWORKS-WEIGHT GRADIENT CALCULATION;"

U.S. Nonprovisional patent application Ser. No. 17/364,110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364,129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364,141, filed Jun. 30, 2021, entitled ""LOSSLESS TILING IN CONVOLUTION NETWORKS—PADDING AND RE-TILLING AT SECTION BOUNDARIES;"

U.S. Nonprovisional patent application Ser. No. 17/384,507, filed Jul. 23, 2021, entitled "LOSSLESS TILING IN CONVOLUTION NETWORKS-BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397,241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216,509, now U.S. Pat. No. 11,191,182 B1, filed Mar. 29, 2021, entitled "UNIVERSAL RAIL KIT;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378,342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378,391, now U.S. Pat. No. 11,327,771 B1, filed Jul. 16, 2021, entitled "DEFECT REPAIR CIRCUITS FOR A RECONFIGURABLE DATA PROCESSOR;"

- U.S. Nonprovisional patent application Ser. No. 17/378,399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"
- U.S. Provisional Patent Application No. 63/220,266, filed Jul. 9, 2021, entitled "LOGIC BIST AND FUNCTIONAL TEST FOR A CGRA;"
- U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"
- U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"
- U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"
- U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"
- U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"
- U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"
- U.S. Provisional Patent Application No. 63/230,782, filed Aug. 8, 2021, entitled "LOW-LATENCY MASTER-SLAVE CLOCKED STORAGE ELEMENT;"
- U.S. Provisional Patent Application No. 63/236,218, filed Aug. 23, 2021, entitled "SWITCH FOR A RECONFIGURABLE DATAFLOW PROCESSOR;"
- U.S. Provisional Patent Application No. 63/236,214, filed Aug. 23, 2021, entitled "SPARSE MATRIX MULTIPLIER;"
- U.S. Provisional Patent Application No. 63/389,767, filed Jul. 15, 2022. entitled "PEER-TO-PEER COMMUNICATION BETWEEN RECONFIGURABLE DATAFLOW UNITS;"
- U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a method of operating a placer and router for an iterative placement and routing of a sorted operation unit graph on a reconfigurable processor. Furthermore, the present technology relates to a placer and router for an iterative placement and routing of a sorted operation unit graph on a reconfigurable processor and to a non-transitory computer-readable storage medium including instructions that, when executed by a processing unit, cause the processing unit to operate a placer and router for an iterative placement and routing of a sorted operation unit graph on a reconfigurable processor.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the rapid expansion of applications that can be characterized by dataflow processing, such as natural-language processing and recommendation engines, the performance and efficiency challenges of traditional, instruction set architectures have become apparent. First, the sizable, generation-to-generation performance gains for multicore processors have tapered off. As a result, developers can no longer depend on traditional performance improvements to power more complex and sophisticated applications. This holds true for both CPU (Central Processing Unit) fat-core and GPU (Graphics Processing Unit) thin-core architectures.

A new approach is required to extract more useful work from current semiconductor technologies. Amplifying the gap between required and available computing is the explosion in the use of deep learning. According to a study by OpenAI, during the period between 2012 and 2020, the compute power used for notable artificial intelligence achievements has doubled every 3 or 4 months.

While the performance challenges are acute for machine learning, other workloads such as analytics, scientific applications and even SQL data processing all could benefit from dataflow processing. New approaches should be flexible enough to support broader workloads and facilitate the convergence of machine learning and high-performance computing or machine learning and business applications.

It is common for GPUs to be used for training and CPUs to be used for inference in machine learning systems based on their different characteristics. Many real-life systems demonstrate continual and sometimes unpredictable change, which means predictive accuracy of models declines without frequent updates.

Alternatively, reconfigurable processors, including FPGAs, can be configured to implement a variety of functions more efficiently or faster than might be achieved using a general-purpose processor executing a computer program.

Recently, so-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, are usually implemented as dataflow architectures and often include specialized hardware elements such as computing resources and device memory that operate in conjunction with a host processor and attached host memory in implementing user applications.

Implementing user applications on reconfigurable processors usually involves placement of the user application onto the reconfigurable processor using a placement tool, which is sometimes also referred to as a placer, and routing of the placed user application using a routing tool, which is sometimes also referred to as a router.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 10' is a flowchart of a method for iteratively placing a current node of an ordered sequence of nodes at a target location and assigning connecting edges to physical links and switches of a reconfigurable processor.

DETAILED DESCRIPTION

Figure 1:
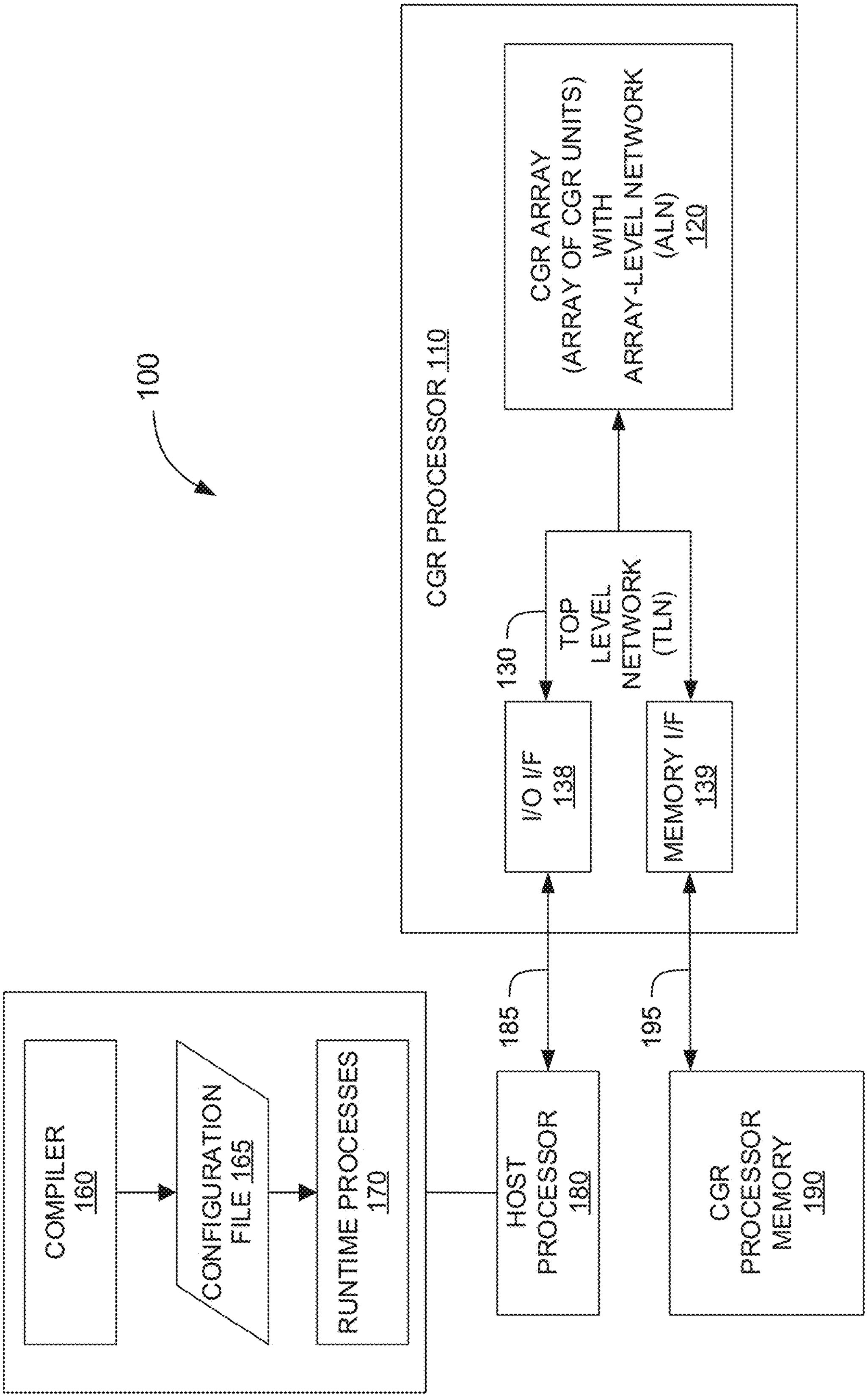
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Applications for machine learning (ML) and artificial intelligence (AI) may require massively parallel computations, where many parallel and interdependent threads (metapipelines) exchange data. Therefore, such applications are ill-suited for execution on Von Neumann computers. They require architectures that are adapted for parallel processing, such as coarse-grained reconfigurable (CGR) architectures (CGRAs) or graphic processing units (GPUS).

The ascent of ML, AI, and massively parallel architectures places new requirements on compilers. Reconfigurable processors, and especially CGRAs, often include specialized hardware elements such as compute units and memory units that operate in conjunction with one or more software elements such as a host processor and attached host memory, and are particularly efficient for implementing and executing highly-parallel applications such as machine learning applications.

Thus, such compilers are required to pipeline computation graphs, or dataflow graphs, decide which operations of an operation unit graph are assigned to which portions of the reconfigurable processor, how data is routed between various compute units and memory units, and how synchronization is controlled, particularly when a dataflow graph includes one or more nested loops, whose execution time varies dependent on the data being processed.

In this context, it is particularly important for the compiler to perform hardware resource allocation during placement and routing such that the performance of a dataflow graph implementation on a given reconfigurable processor is optimized while the implementation optimizes the utilization rate of the reconfigurable processor's hardware resources.

A placement tool typically receives an operation unit graph having nodes that correspond to circuitry on the reconfigurable processor and edges that interconnect the nodes, together with a description of the reconfigurable processor architecture. The placement tool outputs a placed operation unit graph in which each node is assigned to a location on the reconfigurable processor such that one or more objectives is optimized.

Such objectives may include, for example, minimizing wire congestion to ensure that a placed operation unit graph can be routed, optimizing timing such that the implemented application can be executed at a predetermined clock speed, minimizing latency, maximizing throughput, or a combination thereof. Sometimes, measurable approximations of these objectives are used instead to simplify the quantification of these objectives. For example, the estimated maximum wire length between two placed nodes may be used to approximate timing. Conventionally, two or more objectives are combined in form of a cost function. Such a cost function is often expressed in form of a weighted sum of different objectives. The coefficients of the weighted sum may be selected to achieve a predetermined trade-off between the objectives.

Some placement tools start with an initial placement in which every node is assigned to an initial location and an initial cost for the initial placement is calculated. In subsequent passes, the placement tools determine a current placement by assigning nodes to alternative locations and calculate a cost associated with the current placement, which may be selected as the best current placement or not based on the cost. The determination of the current placement and the selection as the best current placement usually depend on the placement tool.

For example, a placement tool that operates on the basis of a simulated annealing (SA) algorithm may start with an initial placement and perform node swaps during an optimization phase. During the optimization phase, the placement tool may randomly select two nodes and swap their location assignments to determine a current placement. The current placement is always adopted if the cost of the current placement is lower than the cost of the best placement encountered so far. However, the current placement is also adopted with a certain probability as the best placement even if the cost of the current placement is higher than the cost of the best placement encountered so far, whereby the probability of accepting node swaps that lead to a current placement with a higher cost than the best placement decreases with the number of node swaps. The acceptance of node swaps that lead to a current placement with a higher cost than the best placement encountered so far is necessary to avoid placement solutions that are associated with a local optimum of the cost function.

After the placement tool has finished placing the operation unit graph, the routing tool begins to connect the placed nodes on the reconfigurable processor according to the connections in the operation unit graph and the available reconfigurable interconnect fabric of the reconfigurable processor. Therefore, the routing tool typically receives the placed operation unit graph together with the description of the reconfigurable processor architecture.

Some routing tools start with an initial routing in which every edge of the operation unit graph uses the shortest path between the source and the sink node, regardless of any congestion or routing blockages. Thereby, edges of the operation unit graph are assigned to a set of interconnect resources on the shortest path between the source and the sink node to form a connection between the source and the sink node on the reconfigurable processor.

In subsequent passes, the routing tool removes and re-routes the connections that use an oversubscribed interconnect resource starting with the connection having the lowest cost path. The cost of using an interconnect resource is dependent on the current overuse of the interconnect resource and any overuse from a prior pass. Thereby, the cost of using an oversubscribed interconnect resource is gradually increased such that connections with the lowest cost path are encouraged to use alternative interconnect resources. Thus, only the connections with the highest cost continue to use the previously oversubscribed interconnect resource.

As mentioned above, CGRAs are an extremely attractive platform when performance, power, or energy efficiency are paramount. A CGRA is usually a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Since reconfigurable processors such as CGRAs have a different architecture than fine-grained reconfigurable devices, it is desirable to provide a new placement and routing approach for implementing user applications on coarse-grained reconfigurable processors. Such a new placement and routing approach may combine the sorting of the nodes in the operation unit graph in preparation for the assignment of nodes from the operation unit graph to circuitry in the reconfigurable processors and the assignment of edges in the operation unit graph to interconnect resources in the reconfigurable processor.

The new approach should quickly and reliably achieve a functioning implementation of the user applications on the coarse-grained reconfigurable processor and provide for a flexible and efficient use of the reconfigurable data-flow resources for the execution of the user applications.

FIG. 1 illustrates an example data processing system 100 including a host processor 180, a reconfigurable processor such as a coarse-grained reconfigurable (CGR) processor 110, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. A high-level program is source code written in programming languages like Spatial, Python, C++, and C. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

If desired, the high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

The architecture, configurability, and data flow capabilities of CGR array 120 enables increased compute power that supports both parallel and pipelined computation. CGR processor 110, which includes CGR arrays 120, can be programmed to simultaneously execute multiple independent and interdependent data flow graphs. To enable simultaneous execution, the data flow graphs may be distilled from a high-level program and translated to a configuration file for the CGR processor 110. In some implementations, execution of the data flow graphs may involve using more than one CGR processor 110.

Host processor 180 may be, or include, a computer such as further described with reference to FIG. 2. Host processor 180 runs runtime processes 170, as further referenced herein. In some implementations, host processor 180 may also be used to run computer programs, such as the compiler 160 further described herein with reference to FIG. 6. In some implementations, the compiler may run on a computer that is similar to the computer described with reference to FIG. 2, but separate from host processor 180.

The compiler may perform the translation of high-level programs to executable bit files. While traditional compilers sequentially map operations to processor instructions, typically without regard to pipeline utilization and duration (a task usually handled by the hardware), an array of CGR units 120 requires mapping operations to processor instructions in both space (for parallelism) and time (for synchronization of interdependent computation graphs or data flow graphs). This requirement implies that a compiler for the CGR array 120 decides which operation of a computation graph or data flow graph is assigned to which of the CGR units in the CGR array 120, and how both data and, related to the support of data flow graphs, control information flows among CGR units in the CGR array 120, and to and from host processor 180 and attached CGR processor memory 190.

The compiler may include a cost estimation tool for determining bandwidth requirements of the edges in the computation graph or data flow graph as well as a sorting tool for determining an ordered sequence of nodes in the computation graph or data flow graph for placing and routing the computation graph or data flow graph on CGR processor 110. An illustrative placer and router for an iterative placement and routing of such an ordered sequence of nodes of a computation graph or data flow graph, which is sometimes also referred to as "operation unit graph" is further described herein with reference to FIG. 8.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file 165. Runtime processes 170 may install the configuration file 165 in CGR processor 110. In some implementations described herein, a CGR array 120 is configured by programming one or more configuration stores with all or parts of the configuration file 165. Therefore, the configuration file is sometimes also referred to as a programming file.

A single configuration store may be at the level of the CGR processor 110 or the CGR array 120, or a CGR unit may include an individual configuration store. The configuration file 165 may include configuration data for the CGR array and CGR units in the CGR array, and link the computation graph to the CGR array. Execution of the configuration file by CGR processor 110 causes the CGR array(s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
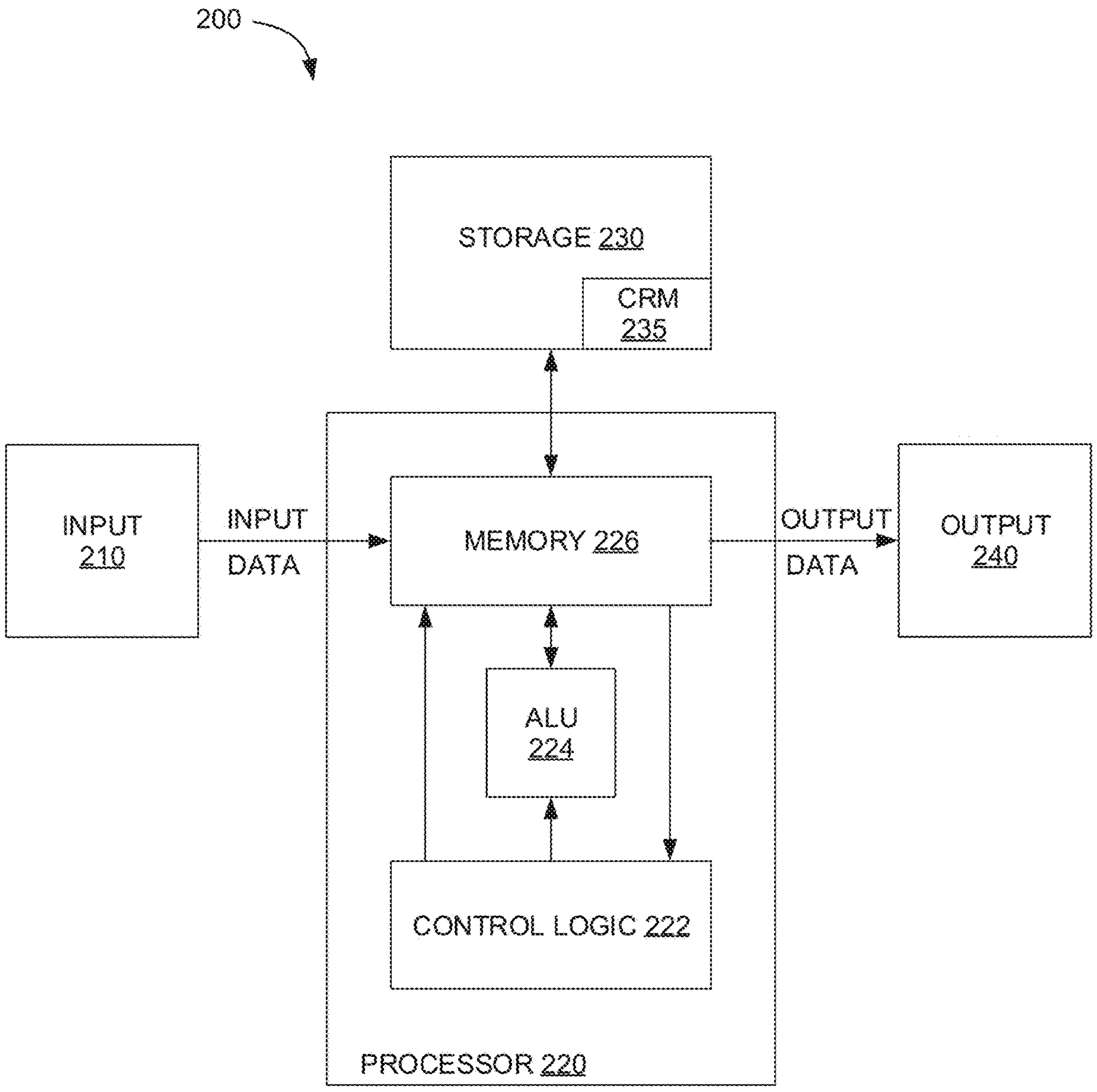
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM) 235, such as used for storing computer programs. The storage device 230 is sometimes also referred to as host memory.

Figure 3:
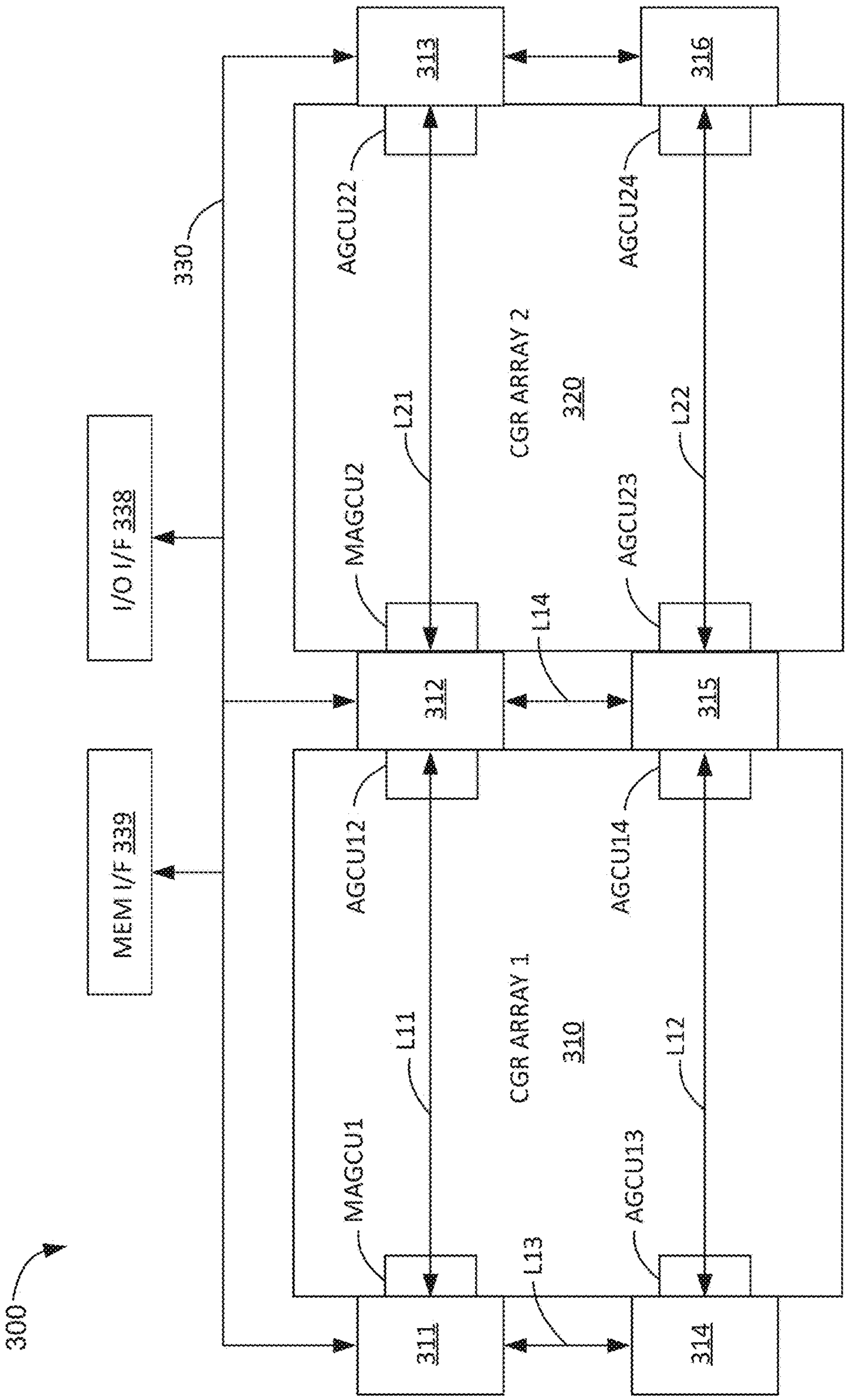
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
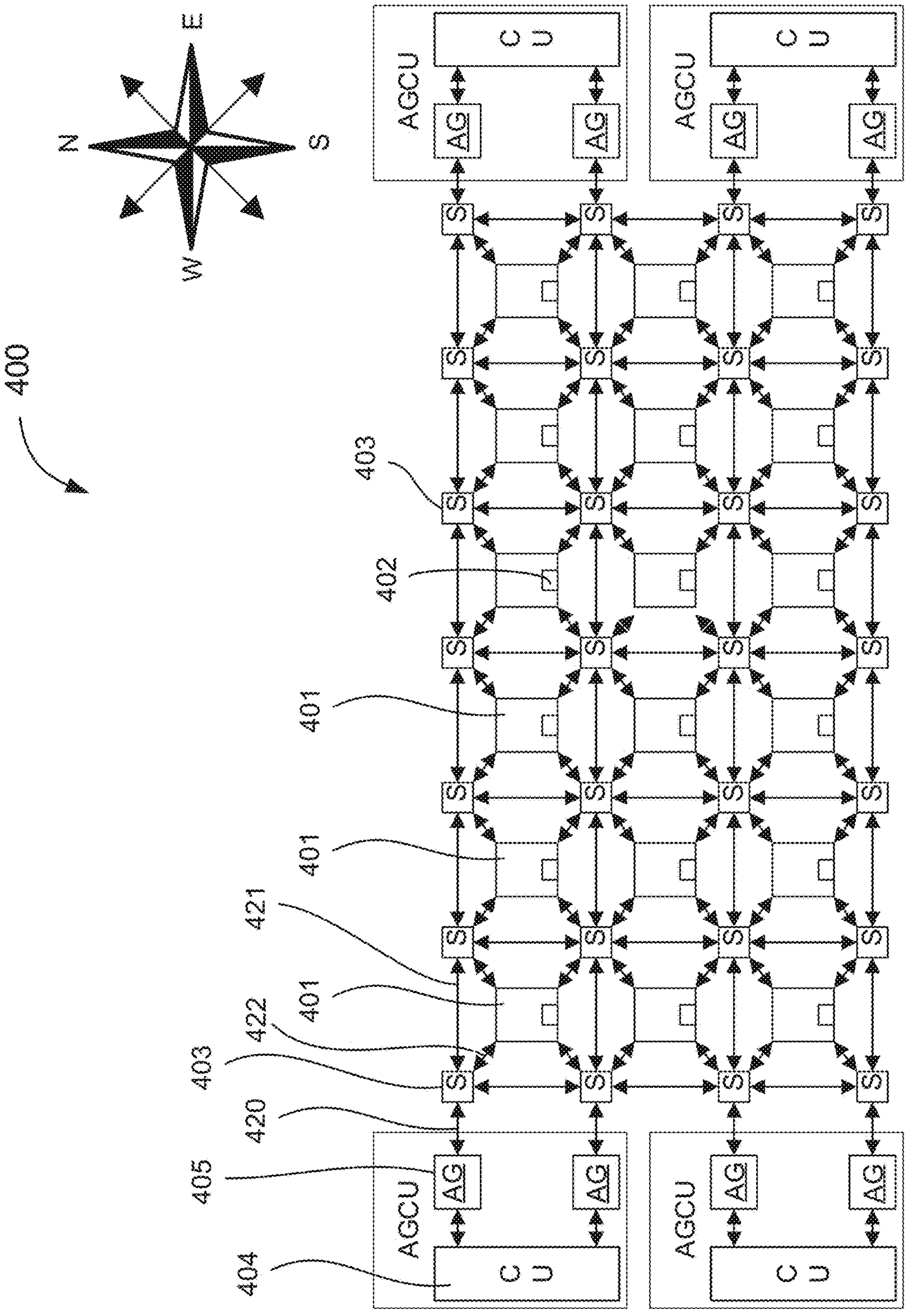
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada.

Illustratively, each CGR unit of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes 170, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., Northeast, Northwest, Southeast, Southwest, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance using one of the interconnects 422. Two switch units 403 in each CGR array quadrant have links to an AGCU using interconnects 420. The coalescing unit 404 of the AGCU arbitrates between the address generators 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more interconnects 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
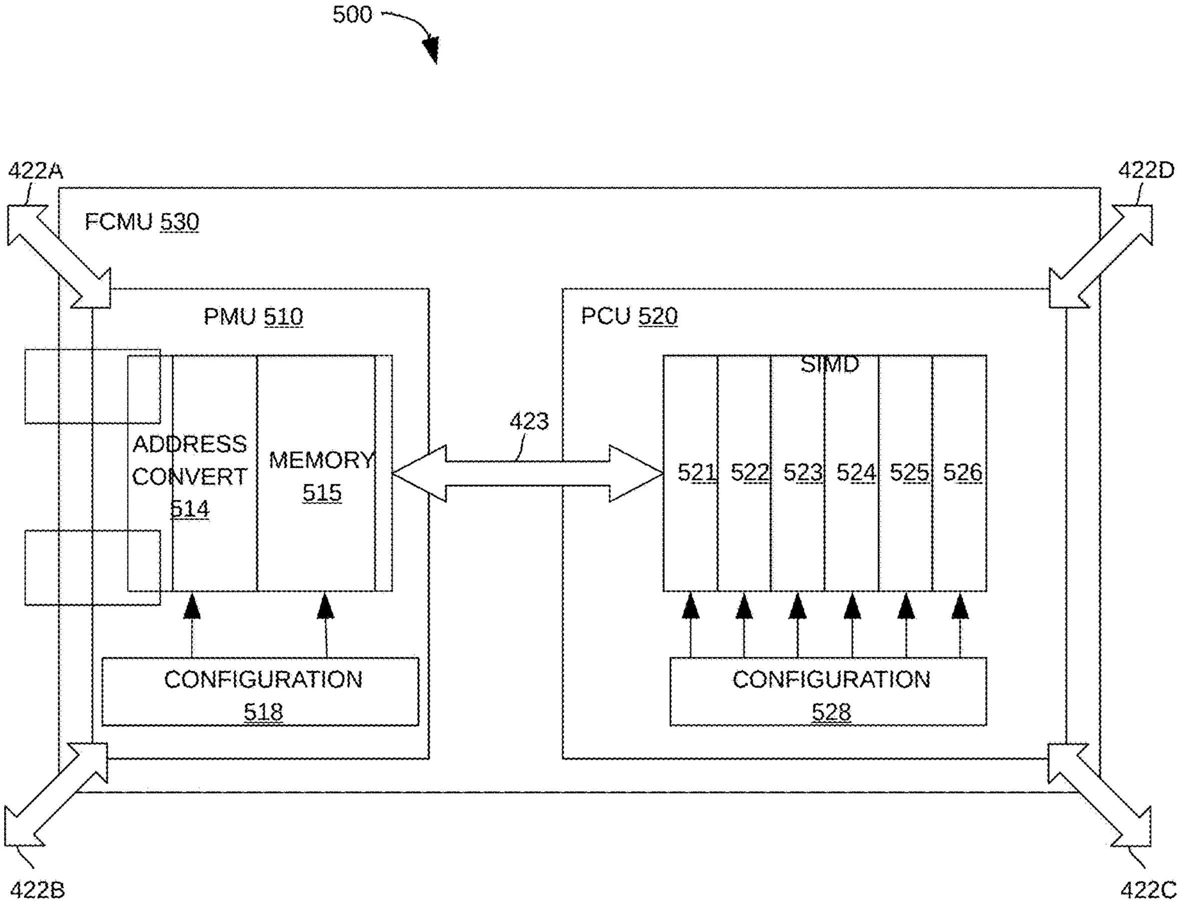
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. The FCMU 530 may include multiple ALN links, such as ALN link 423 that connects PMU 510 with PCU 520, northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D may connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

PMU 510 may include an address converter 514, a scratchpad memory 515, and a configuration store 518. Configuration store 518 may be loaded, for example, from a program running on host processor 180 as shown in FIG. 1, and can configure address converter 514 to generate or convert address information for scratchpad memory 515 based on data received through one or more of the ALN links 422A-B, and/or 423. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes two or more processor stages, such as single-instruction multiple-data (SIMD) 521 through SIMD 526, and configuration store 528. The processor stages may include SIMDs, as drawn, or any other reconfigurable stages that can process data. PCU 520 may receive data through ALN links 422C-D, and/or 423, and process the data in the two or more processor stages or store the data in configuration store 528. PCU 520 may produce data in the two or more processor stages, and transmit the produced data through one or more of the ALN links 422C-D, and/or 423. If the two or more processor stages include SIMDs, then the SIMDs may have a number of lanes of processing equal to the number of lanes of data provided by a vector interconnect of ALN links 422C-D, and/or 423.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
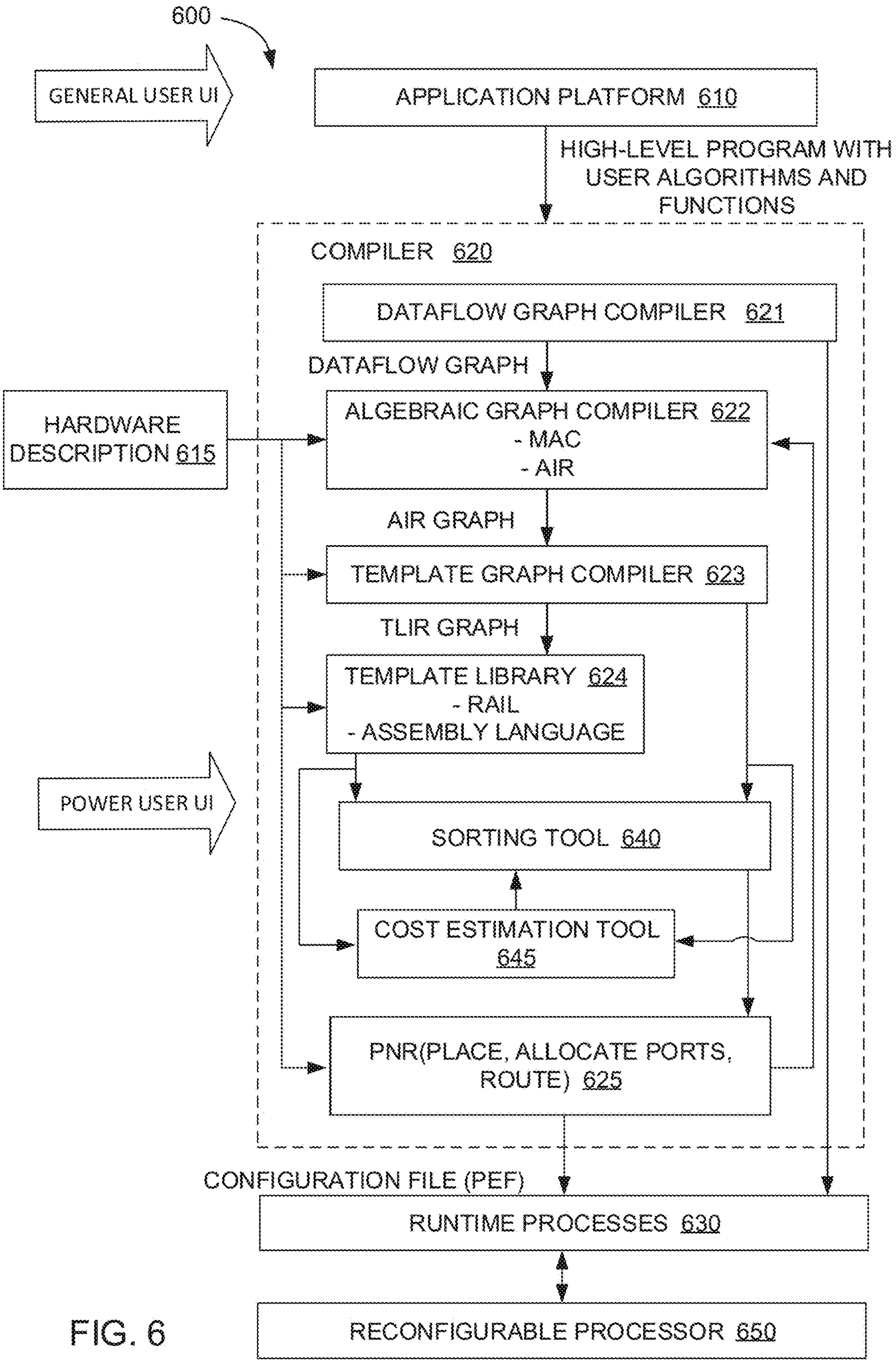
FIG. 6 is a diagram of an illustrative compiler stack implementation suitable for generating a configuration file for a reconfigurable processor.

FIG. 6 is a block diagram of a compiler stack 600 implementation suitable for generating a configuration file for a reconfigurable processor 650 having CGR units such as CGR processor 110 of FIG. 1. As depicted, compiler stack 600 includes several stages to convert a high-level program with statements that define user algorithms and functions, e.g., algebraic expressions and functions, to configuration data for the CGR units. A high-level program may include source code written in programming languages like C, C++, Java, JavaScript, Python, and/or Spatial, for example. In some implementations, the high-level program may include statements that invoke various PyTorch functions.

Compiler stack 600 may take its input from application platform 610, or any other source of high-level program statements suitable for parallel processing, which provides a user interface for general users. If desired, the compiler stack 600 may further receive hardware description 615, for example defining the physical units in a reconfigurable data processor or CGR processor. Application platform 610 may include libraries such as PyTorch, TensorFlow, ONNX, Caffe, and Keras to provide user-selected and configured algorithms.

Application platform 610 outputs a high-level program to compiler 620, which in turn outputs a configuration file that is executed in runtime processes 630 using reconfigurable processor 650.

Compiler 620 may include dataflow graph compiler 621, which may handle a dataflow graph, algebraic graph compiler 622, template graph compiler 623, template library 624, placer and router PNR 625, and cost estimation tool 645. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610. As shown in FIG. 6, dataflow graph compiler 621 outputs a dataflow graph that is received by algebraic graph compiler 622.

Algebraic graph compiler 622 may include a model analyzer and compiler (MAC) level that makes high-level mapping decisions for (subgraphs of the) dataflow graph based on hardware constraints. In some implementations, the algebraic graph compiler 622 may support various application frontends such as Samba, JAX, and TensorFlow/HLO. If desired, the algebraic graph compiler 622 may transform the graphs via autodiff and GradNorm, perform stitching between subgraphs, interface with template generators for performance and latency estimation, convert dataflow graph operations to arithmetic or algebraic intermediate representation (AIR) operations, perform tiling, sharding (database partitioning) and other operations, and model or estimate the parallelism that can be achieved on the dataflow graph.

Algebraic graph compiler 622 may further include an arithmetic or algebraic intermediate representation (AIR) level that translates high-level graph and mapping decisions provided by the MAC level into explicit AIR/Tensor statements and one or more corresponding algebraic graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Thus, algebraic graph compiler 622 replaces the user program statements of a dataflow graph by AIR/Tensor statements of an AIR/Tensor computation graph (AIR graph). As shown in FIG. 6, algebraic graph compiler 622 provides the AIR graph to template graph compiler 623.

Template graph compiler 623 may translate AIR/Tensor statements of an AIR graph into template library intermediate representation (TLIR) statements of a TLIR graph, optimizing for the target hardware architecture into unplaced variable-sized units (referred to as logical CGR units) suitable for PNR 625. Such a TLIR graph is sometimes also referred to as an "operation unit graph" and the unplaced-variable-sized units as "logical units" or "nodes". So-called "Logical edges" or simply "edges" in the operation unit graph may couple the logical units.

Template graph compiler 623 may allocate metapipelines for sections of the template dataflow statements and corresponding sections of unstitched template computation graph. Template graph compiler 623 may add further information (e.g., name, inputs, input names and dataflow description) for PNR 625 and make the graph physically realizable through each performed step. For example, template graph compiler 623 may provide translation of AIR graphs to specific model operation templates such as for general matrix multiplication (GeMM). An implementation may convert part or all intermediate representation operations to templates, which are sometimes also referred to as "template nodes", stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units, which are commonly referred to as logical units, with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

In some implementations, the assembler may generate assembler code for a logical unit, whereby the assembler code is associated with a data operation that is to be executed by the logical unit. The logical units of an operation unit graph may include (e.g., store) the assembler code that is associated with the respective data operations of the respective logical units, if desired.

The template graph compiler 623 may also determine control signals, as well as control gates that are required to enable the CGR units (whether logical or physical) to coordinate dataflow between the CGR units in the CGR array of a CGR processor.

As shown in FIG. 6, compiler 620 may include a cost estimation tool 645 and a sorting tool 640. The cost estimation tool 645 is adapted for determining relative bandwidth requirements of the edges in an operation unit graph. The sorting tool 640 may use the relative bandwidth requirements to provide an ordered sequence of the nodes in the operation unit graph to PNR for implementing the operation unit graph on reconfigurable processor 650.

In some implementations, the sorting tool 640 and/or the cost estimation tool 645 may be integrated into PNR 625. In other implementations, the sorting tool 640 and/or the cost estimation tool 645 may be separate from PNR 625, for example as shown in FIG. 6.

Illustratively, cost estimation tool 645 may receive the operation unit graph from the template graph compiler 623 directly and/or through the template library 624. The operation unit graph includes nodes and edges that couple the nodes. Each one of the nodes is associated with a data operation.

Illustratively, sorting tool 640 may receive an operation unit graph and determine an ordered sequence of the nodes in the operation unit graph for PNR 625. Execution of the sorting tool 640 may be followed by iterative passes of PNR 625 based on the ordered sequence of the nodes, whereby nodes that are earlier in the ordered sequence of nodes are placed and routed before nodes that are later in the node order. In other words, the sorting tool 640 may determine a priority for the placement and routing of the nodes.

PNR 625 translates and maps logical (i.e., unplaced physically realizable) units (e.g., the nodes of the operation unit graph) and edges (e.g., the edges of the operation unit graph) to a physical layout of reconfigurable processor 650, e.g., a physical array of CGR units in a semiconductor chip. PNR 625 also determines physical data channels, which are sometimes also referred to as "physical links", to enable communication among the CGR units and between the CGR units and circuits coupled via the TLN or the ALN; allocates ports on the CGR units and switches; provides configuration data and initialization data for the target hardware; and produces configuration files, e.g., processor-executable format (PEF) files.

If desired, PNR 625 may provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules to provide the multiple operations, e.g., a placer, a router, a port allocator, and a PEF file generator, which each may also include multiple units to provide operations within the modules (e.g., as illustratively shown in FIG. 8).

PNR 625 may receive its input data in various ways. For example, it may receive parts of its input data from any of the earlier modules (e.g., dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly. As shown in FIG. 6, PNR 625 may receive a sorted operation unit graph having an ordered sequence of nodes and edges that interconnect nodes in the ordered sequence of nodes from sorting tool 640.

Further implementations of compiler 620 provide for an iterative process, for example by feeding information from PNR 625 back to an earlier module (e.g., to algebraic graph compiler 622). For example, in some implementations, the earlier module may execute a new compilation step in which it uses physically realized results rather than placeholders for physically realizable circuits. As shown in FIG. 6, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

Figure 7:
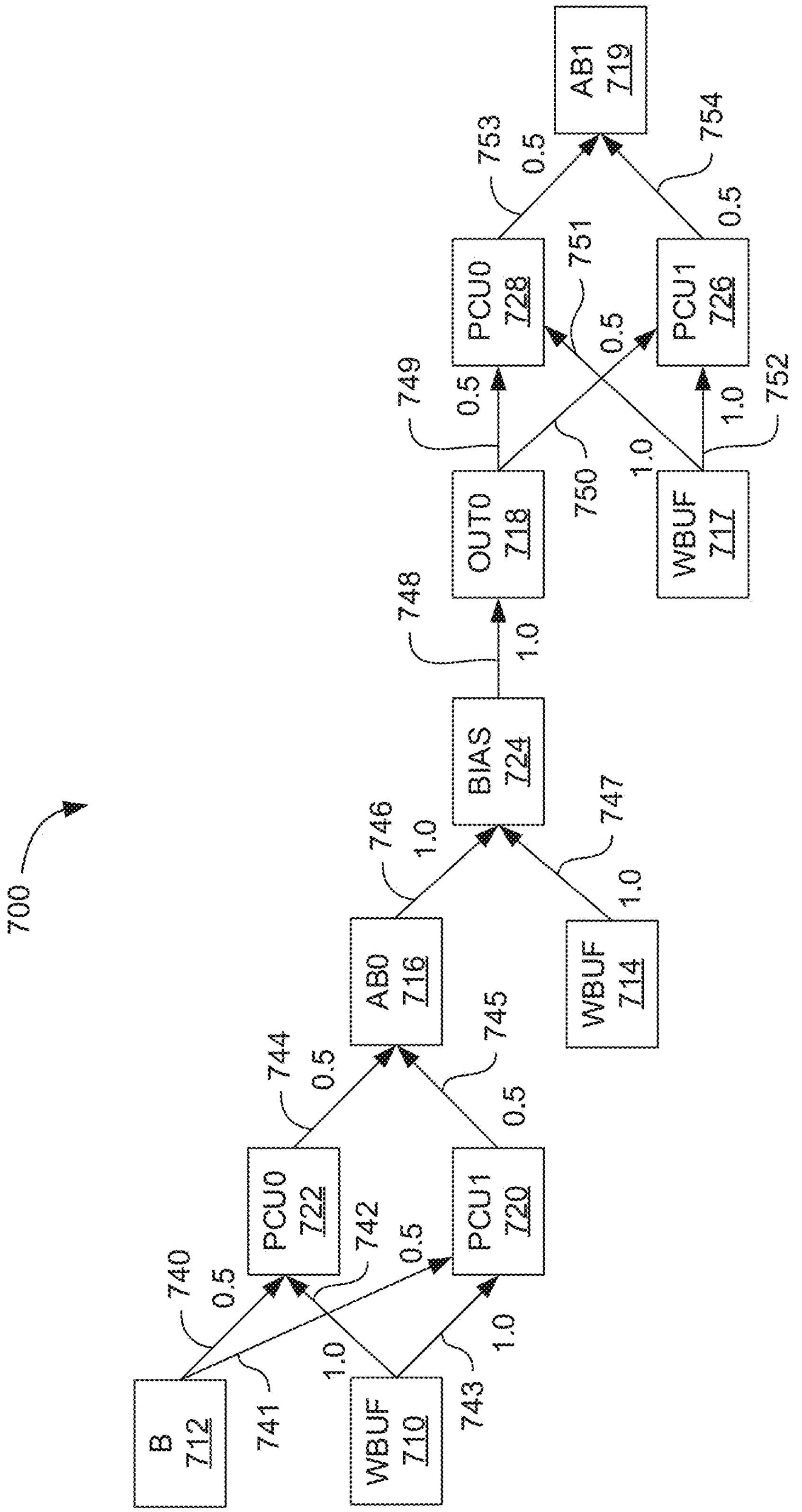
FIG. 7 is a diagram of an illustrative operation unit graph.

FIG. 7 is a diagram of an illustrative operation unit graph 700. The operation unit graph 700 shown in FIG. 7 includes nodes WBUF 710, B 712, WBUF 714, AB0 716, WBUF 717, OUT0 718, AB1 719, PCU1 720, PCU0 722, BIAS 724, PCU1 726, and PCU0 728 and edges 740 to 754 that connect the nodes in operation unit graph 700.

The nodes are associated with data operations. The data operations may include configuration load, configuration unload, arithmetic operations, storage operations, just to name a few. If desired, each node may include assembler code that is associated with the data operation. For example, a first node of the nodes in the operation unit graph may include assembler code that is associated with the data operation of the first node.

Illustratively, the operation unit graph 700 may include different types of nodes. For example, a first node of the nodes may include a compute unit (e.g., PCU 520 of FIG. 5) or a memory unit (e.g., PMU 510 of FIG. 5). As shown in FIG. 7, the operation unit graph 700 may include nodes WBUF 710, B 712, WBUF 714, AB0 716, WBUF 717, OUT0 718, and AB1 719 that may illustratively be associated with a memory unit on a reconfigurable processor such as PMU 510 of FIG. 5 and nodes PCU1 720, PCU0 722, BIAS 724, PCU1 726, and PCU0 728 that may illustratively be associated with a compute unit on a reconfigurable processor such as PCU 520 of FIG. 5.

By way of example, nodes WBUF 710, B 712, WBUF 714, and WBUF 717 are shown as input nodes (i.e., nodes without fan-in and only outgoing edges) and node AB1 719 is shown as output node (i.e., node without fanout and only incoming edges). However, input nodes WBUF 710, B 712, WBUF 714, and WBUF 717 may have input ports and output node AB1 719 may have output ports. For example, the input ports of input nodes and the output ports of the output node may be coupled outside of the operation unit graph 700 (e.g., via a network).

In some implementations, a node may have a type identifier that corresponds to one of the hardware circuits on the reconfigurable processor. An edge of the edges 740 to 754 of the operation unit graph 700 may represent a relationship, a direction, and/or a dependency between the nodes that are connected by the edge. If desired, a weight or cost may be associated with an edge. The weight or cost may be associated with the relative bandwidth requirements of the connection between the nodes that are connected by the edge. If desired, the weight of an edge may be greater than zero and smaller than or equal to one (i.e., 0<edge weight<=1, an edge with weight zero is not required and therefore not shown).

Illustratively, a node may have more than one output edge (e.g., node B 712 has two output edges). In some scenarios, the node may send the same data to more than one other node. As an example, node B 712 of FIG. 7 may send the same data to nodes PCU0 722 and PCU1 720. In this example, the two output edges that transmit the same data to nodes PCU0 722 and PCU1 720 may be a net of fanout two. As another example, node B 712 may send a first set of data to PCU0 722 and a second set of data to PCU1 720, whereby the second set is subset of the first set. If desired, the first set of data may be different from the second set of data.

The operation unit graph 700 of FIG. 7 is a connected operation unit graph in which every node can be reached from at least one input node. In some implementations, the operation unit graph may include two or more connected subgraphs that are not connected with each other.

Figure 8:
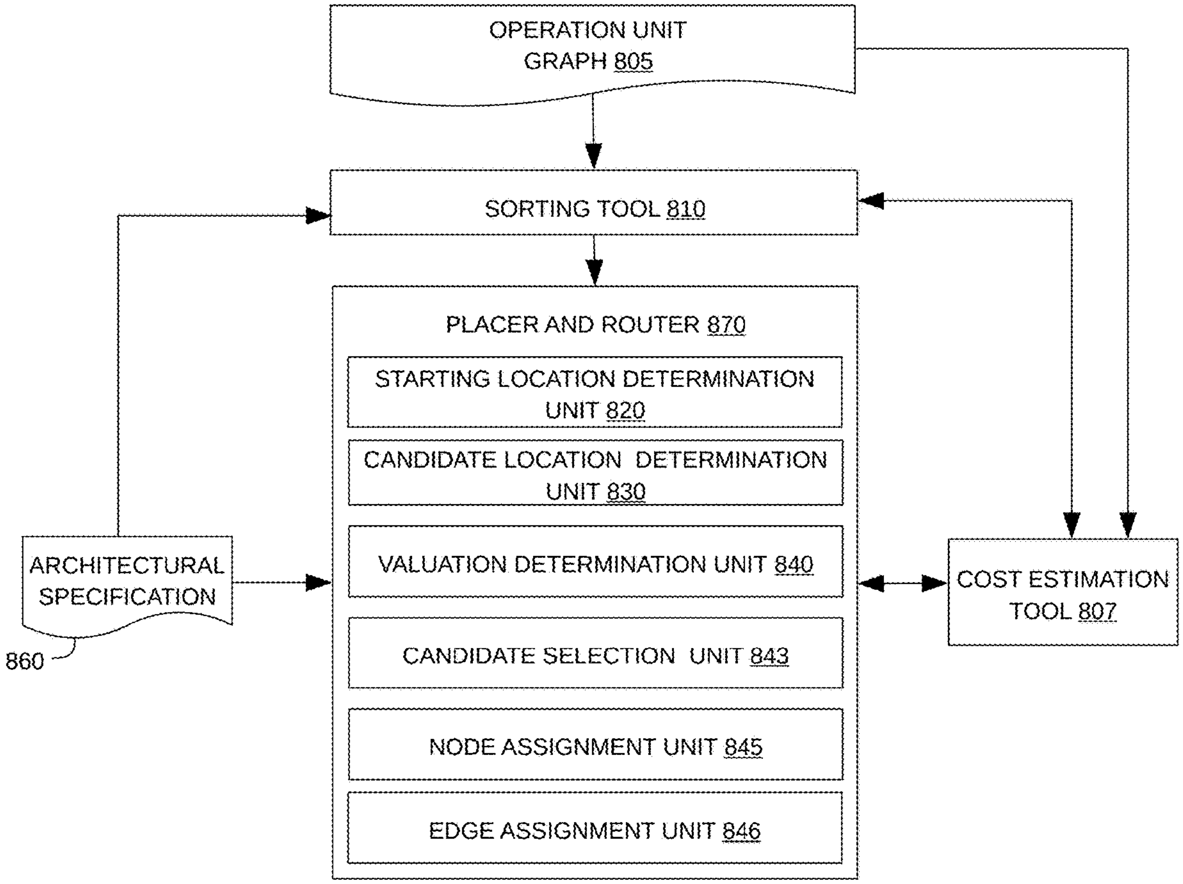
FIG. 8 is a diagram of an illustrative placement and routing tool that receives a sorted operation unit graph with an ordered sequence of nodes and edges that interconnect the nodes in the ordered sequence of nodes.

FIG. 8 is a diagram of an illustrative placer and router 870. Placer and router 870 includes multiple modules and/or tools such as a placement tool and a routing tool. By way of example, the placement tool of the illustrative placer and router 870 may include a starting location determination unit 820, a candidate location determination unit 830, a valuation determination unit 840, a candidate selection unit 843, and a node assignment unit 845, and the routing tool of the illustrative placer and router 870 may include an edge assignment unit 846. If desired, placer and router 870 may include a port allocator and a PEF file generator. In some implementations, placer and router 870 may include a sorting tool and/or a cost estimation tool. As shown in FIG. 8, cost estimation tool 807 and sorting tool 810 are separate from placer and router 870.

Illustratively, the cost estimation tool 807 interfaces with the sorting tool 810 and the placer and router 870. The cost estimation tool 807 may receive the operation unit graph 805 (e.g., operation unit graph 700 of FIG. 7) including nodes and edges that interconnect the nodes. The sorting tool 810 and/or the placer and router 870 may solicit the cost estimation tool 807 to provide valuations to the sorting tool 810 and/or to the placer and router 870. As an example, the sorting tool 810 may solicit the cost estimation tool 807 to provide relative bandwidth requirements of the edges to the sorting tool 810.

As shown in FIG. 8, the sorting tool 810 receives the operation unit graph 805, determines an ordered sequence of the nodes in the operation unit graph 805 and provides the ordered sequence of nodes to the placer and router 870.

Placer and router 870 is configured to receive the sorted operation unit graph having an ordered sequence of nodes and edges that interconnect nodes in the ordered sequence of nodes from sorting tool 810. Placer and router 870 is also configured to receive an architectural specification of the reconfigurable processor (e.g., CGR processor 110 having arrays of CGR units 120 of FIG. 1 or reconfigurable processor 650 of FIG. 6) on which the placer and router 870 implements the sorted operation unit graph.

During placement, a node of the sorted operation unit graph may be placed on the reconfigurable processor. For example, the node of the sorted operation unit graph is assigned to a corresponding circuit that is located at an associated location on the reconfigurable processor. During routing, the connections between the recently placed node and all previously placed nodes of the operation unit graph that are connected to the recently placed node are routed.

For example, the configurable interconnect of the reconfigurable processor may be programmed such that the interconnect implements the connections between the recently placed node and all previously placed nodes that are connected to the recently placed node. Thereby, the routing determines the interconnection resources (e.g., switches, channels) through which the data flows between the placed nodes (i.e., between the associated locations on the reconfigurable processor). Thus, placement determines where operations are executed, whereas routing determines the interconnection resources through which data flows between operations.

After having received the architectural specification of the reconfigurable processor and the sorted operation unit graph from the sorting tool 810, the placer and router 870 is configured to repeat a plurality of subsequent operations as long as the ordered sequence of nodes comprises at least one unassigned node. For performing the plurality of subsequent operations, the placer and router is configured to retrieve a first unassigned node from the ordered sequence of nodes as a current node in order of the ordered sequence of nodes, determine a starting location on the reconfigurable processor for performing a search of candidate locations on the reconfigurable processor that are suitable for placing the current node, determine candidate locations on the reconfigurable processor for placing the current node based on the starting location, for each candidate location of the candidate locations, determine a valuation associated with placing the current node at the candidate location, select among the candidate locations a target location with an associated valuation that satisfies a predetermined criterion, assign the current node to the target location, and assign edges that connect the current node with already assigned nodes of the ordered sequence of nodes to physical links and switches of the reconfigurable processor.

As mentioned above, the placer and router 870 is configured to retrieve a first unassigned node from the ordered sequence of nodes as a current node in order of the ordered sequence of nodes. Thus, nodes that are earlier in the ordered sequence of nodes may be placed and routed before nodes that are later in the ordered sequence of nodes. Alternatively, nodes that are later in the ordered sequence of nodes may be placed and routed before nodes that are earlier in the ordered sequence of nodes. In other words, the ordered sequence of nodes determines a priority for the placement and routing of the nodes.

The starting location determination unit 820 of the placer and router 870 is configured to determine a starting location on the reconfigurable processor for performing a search of candidate locations on the reconfigurable processor that are suitable for placing the current node. As an example, the starting location determination unit 820 may be configured to determine a location of a most recently assigned node of the already assigned nodes as the starting location on the reconfigurable processor. As another example, the starting location determination unit 820 may be configured to determine a location of one of the already assigned nodes as the starting location on the reconfigurable processor, whereby an edge with a highest bandwidth requirement connects the current node with the one of the already assigned nodes. As yet another example, the starting location determination unit 820 may be configured to determine a location with a minimum gravitational pull that the current node experiences through connections with the already assigned nodes as the starting location on the reconfigurable processor, whereby connections with a higher bandwidth requirement exert a higher attraction force than connections with a lower bandwidth requirement.

The candidate location determination unit 830 of the placer and router 870 is configured to determine candidate locations on the reconfigurable processor for placing the current node based on the starting location. Illustratively, the placer and router 870 may be configured to determine a predetermined number of suitable candidate locations as the candidate locations by searching starting from the starting location and with increasing distance to the starting location, wherein a suitable candidate location of the predetermined number of suitable candidate locations includes circuitry that is unassigned and able to implement the current node.

For example, the candidate location determination unit 830 of placer and router 870 may start with the point of departure as a current location for the search of suitable candidate locations. The placer and router 870 may check whether the current location can implement the current node. For example, the placer and router 870 may check whether the current location includes the circuitry that is required to implement the current node.

As an example, a virtual address generator (VAG) node may only be placed in locations with address generation capabilities. Similarly, a memory node may only be placed in locations with memory units or PMUs, while a computation node may only be placed in locations with compute units or PCUs.

In the example of the CGR array 400 of FIG. 4, a VAG node may only be placed in locations that have an address generator 405 inside an address generator and coalescing unit (AGCU). Similarly, in the CGR array 400 of FIG. 4, a memory node may only be placed in locations 401 that have a memory unit, a PMU, or an FCMU, and a computation node may only be placed in locations 401 that have a compute unit, a PCU, or an FCMU In some implementations, when placing a VAG node, the placer and router 870 may determine the potential congestion in the vicinity of an AGCU and select the AGCU with the lowest potential congestion after having examined all AGCU locations. In other implementations, the placer and router 870 may determine the potential congestion in the vicinity of an AGCU and select the first AGCU that has a potential congestion below a predetermined threshold. In the latter case, the placer and router 870 may examine the AGCUs in a predetermined order. In the scenario in which the AGCUs are located along the two sides of the CGR array (e.g., along the left and right sides of the CGR array 400 as shown in FIG. 4 or in the corner of the CGR arrays 310 and 320 of the CGRA architecture 300 of FIG. 3), the placer and router 870 may start with determining placing the VAG in an AGCU that is in an arbitrary corner of the reconfigurable processor.

As an example, the placer and router 870 may examine placing the VAG at the locations of the AGCUs of CGRA architecture 300 from left to right and from top to bottom (i.e., in the order MAGCU1, AGCU12, MAGCU2, AGCU22, AGCU13, AGCU14, AGCU23, and AGCU24). As another example, the placer and router 870 may examine placing the VAG at the locations of the AGCUs of CGRA architecture 300 in the inverse order of the previous example (i.e., from left to right and from bottom to top). As yet another example, the placer and router 870 may examine placing the VAG at the locations of the AGCUs of CGRA architecture 300 from top to bottom and from right to left (i.e., in the order AGCU22, AGCU24, MAGCU2, AGCU23, AGCU12, AGCU14, MAGCU1, AGCU13), or in any other appropriate order, if desired.

Illustratively, the placer and router 870 may determine the potential congestion in the vicinity of an AGCU by approximating the available interconnection resources close to the AGCU. In some implementations, the placer and router 870 may approximate the available interconnection resources by determining the currently available bandwidth of the interconnection resources in the vicinity of the respective AGCU. In other implementations, the placer and router 870 may determine the potential congestion in the vicinity of an AGCU by determining the number of memory units or PMUs that are already placed in the vicinity of the respective AGCU. If desired, a weight may be associated with each memory unit or PMU that is already placed in the vicinity of an AGCU. In some implementations, the weight may decrease with an increasing distance from the AGCU.

In the example of the CGRA architecture 300 of FIG. 3, consider the scenario in which each CGR array 310, 320 has 32 columns and 5 rows of PMUs, PCUs, and/or FCMUs, which is sometimes also referred to as a 32×5 CGR array, and an AGCU in every corner of the CGR array. In this scenario, a vicinity of an AGCU may be determined as a 16-column by 3-row quadrant of PMUs, PCUs, and/or FCMUs in each corner of the respective AGCU. In this example, there is a one-row overlap between two neighboring quadrants. In some implementations, the quadrants may be determined without any overlap. For example, the vicinity of an AGCU may be determined as a 16-column by 2-row quadrant in the corner of a CGR array. Illustratively, the vicinity of an AGCU may be determined to be smaller than a quadrant of a CGR array (e.g., a 8-column by 2-row portion of the CGR array closest to the respective AGCU). In other implementations, the quadrants may be determined having an overlap of one or more rows and/or an overlap of one or more columns.

If desired, the placer and router 870 may make a distinction between critical nodes and non-critical nodes. As an example, a node may be considered critical, if it is connected via a high-bandwidth edge (e.g., an edge with a relative bandwidth greater than a predetermined value such as any relative bandwidth greater than 0.7 or 0.8 or 0.9 or any value in between) with an already placed node. As another example, a node may be considered critical, if it has more than a predetermined number of neighbors (e.g., more than 3, or more than 5, or more than 10 neighbors). As yet another example, a node may be considered critical, if it has a VCA edge.

In some implementations, the placer and router 870 may handle critical and non-critical nodes differently. As an example, the placer and router 870 may evaluate a first predetermined number of candidate locations for placing the current node of the operation unit graph if the current node is non-critical and a second predetermined number of candidate locations that is greater than the first predetermined number of candidate locations for placing the current node of the operation unit graph if the current node is critical. As another example, the placer and router 870 may evaluate a first predetermined number of candidate locations for placing the current node of the operation unit graph if the current node is critical, and, in addition, the placer and router 870 may evaluate a second predetermined number of candidate locations for placing the unplaced neighbors of the current node of the operation unit graph for each one of the first predetermined number of candidate locations.

If desired, the placer and router 870 may check whether the current location has sufficient unassigned resource to receive and implement the current node. As yet another example, the placer and router 870 may check whether the current location has sufficient bandwidth on the input and output ports to receive and implement the current node.

If the current location can implement the current node, the current location may be added to the list of suitable candidate locations. If the list of suitable candidate locations does not include at least a predetermined number of suitable candidate locations, the search of suitable candidate locations may continue with moving from the current location to the next location and checking whether the next location can implement the current node.

Illustratively, the placer and router 870 may move from the current candidate location to the next candidate location by moving to the next closest location on the reconfigurable processor. As an example, consider the scenario in which the nodes are placed on a rectangular grid of rows and columns. In this scenario, the placer and router 870 may first evaluate the horizontal neighbor locations of the current candidate location followed by the vertical neighbor locations, the diagonal neighbor locations, the second horizontal neighbor locations, the second vertical locations, above and below the second horizontal neighbor locations, etc. As another example, the placer and router 870 may first evaluate the vertical neighbor locations of the current location followed by the horizontal neighbor locations, the diagonal neighbor locations, the second vertical locations, the second horizontal locations, left and right of the second vertical locations, etc. As yet another example, the placer and router 870 may move in the direction of the already placed node(s) with the highest bandwidth connection with the current node.

The valuation determination unit 840 of placer and router 870 is configured to determine a valuation for each candidate location of the candidate locations, whereby the valuation is associated with placing the current node at the candidate location. For example, for determining the valuation associated with placing the current node at the candidate location, the placer and router 870 may be configured to determine the valuation based on interconnection resources of the reconfigurable processor that are required for connecting the current node with the already assigned nodes.

Illustratively, the placer and router 870 may compute a cost that is based on a predetermined cost function for placing the current node in each one of the predetermined number of suitable candidate locations. The placer and router 870 may select the candidate location among the predetermined number of candidate locations that is associated with the lowest cost and assign the current node to this candidate location.

Illustratively, the predetermined cost function may be based on a single criterion. If desired, the predetermined cost function may be based on two or more criteria. As an example, the predetermined cost function may be calculated as a weighted sum of the two or more criteria. As another example, the predetermined cost function may be based on a first criterion of the two or more criteria and each subsequent criterion may be considered only if two or more candidate locations have the same cost.

As an example, the placer and router, for determining the valuation based on interconnection resources of the reconfigurable processor that are required for connecting the current node with the already assigned nodes, may be configured to determine a total Manhattan distance (i.e., the sum of the row distance and the column distance of the interconnections on a rectangular grid) of all interconnection resources of the reconfigurable processor that are required for connecting the current node with the already assigned nodes. As another example, the placer and router may determine a total Manhattan distance of all interconnection resources of the reconfigurable processor that are required for connecting the current node with the already assigned nodes weighted with associated bandwidth requirements. As yet another example, the placer and router may determine a number of switches required for connecting the current node with the already assigned nodes. As yet another example, the placer and router may determine a channel usage required for connecting the current node with the already assigned nodes.

For example, consider the scenario in which the operation unit graph has a first edge between the current node and a first already placed node at location row 1 and column 3 (i.e., (row 1, col 3)), and a second edge between the current node and a second already placed node at location (row 6, col 6). Consider further that the distance between any two columns is M and the distance between any two rows N. In this scenario, the cost associated with candidate location (row 4, col 5) would be the sum of the Manhattan distance with the first already placed node (i.e., 3M+2N) and the Manhattan distance with the second already placed node (i.e., 2M+N). Thus, the total cost of the candidate location would be (3M+2N)+ (2M+N)=5M+3N. If desired, the Manhattan distance of a connection may be weighted. For example, the Manhattan distances may be weighted with the bandwidth requirements of the first and second edges or with the relative bandwidth requirements of the first and second edges. In the example above, the relative bandwidth requirement of the first edge may be 0.5, whereas the relative bandwidth requirement of the second edge may be 1.0. Thus, the total cost of the candidate location would be 0.5 (3M+2M)+1.0 (2M+N)=3.5M+2N.

As another example, the valuation may be based on the architecture of the interconnection network of the reconfigurable processor. In some embodiments, the reconfigurable processor may have a grid of switches that is interspersed with the grid of memory and compute circuits in rows and columns (e.g., as shown in FIG. 4). In other embodiments, switches may be distributed in another way (e.g., every row, but every other column; or every column, but every other row; or every other row and every other column; or in any other suitable way) or switches may be irregular (e.g., more horizontal through connections than vertical through connections or vice versa, more horizontal through or vertical through connections than connections from horizontal to vertical or vertical to horizontal, etc.), or switch-to-memory circuit, switch-to-compute circuit, memory circuit-to-switch, or compute circuit-to-switch connections may be restricted (e.g., a compute circuit may only receive and/or send data via a port at the north-east (NE) corner from/to the switch that is placed there). Illustratively, the cost may be based on the minimum number of switches that the connections between the current node and already placed nodes have to traverse. If desired, the cost may be based on the usage of a channel (e.g., 256 used lines of 512 available lines in a channel corresponds to a 50% usage of the channel). In some embodiments, the cost may be a combination of the number of switches and the channel usage.

As yet another example, the placer and router 870 may tentatively route all connections between the current node in the candidate location and already placed nodes with which the current node is connected. Once all connections between the current node in the candidate location and already placed nodes have been successfully routed, the valuation of placement for the current candidate location may be calculated. If at least one connection between the current node in the candidate location and already placed nodes cannot be routed successfully, the valuation of placement of the current candidate location may be set to infinity. Otherwise, the valuation may be based on the usage of the interconnection resources for the tentative routes (e.g., channel usage, switch usage, or any combination thereof). In some implementations, the valuation may be a weighted sum of the number of switches, the number of vertical connections and their length, and the number of horizontal connections and their length. In other implementations, the valuation may consider the connections between already placed nodes. For example, the valuation may be based on the total current congestion of the interconnection fabric after placing the current node in the current candidate location.

Additional criteria may be considered based on the architecture of the underlying reconfigurable processor, if desired. For example, nodes may be connected to virtual channels (i.e., one of the input and/or output edges is part of a virtual channel) and some virtual channels (e.g., a virtual channel A) may not provide for end-to-end control of the packets that are sent along this virtual channel A. In this example, the valuation may have a predetermined value (e.g., 0.5, 1, or any other suitable value) for particularly weighting the virtual channel A connection.

The candidate selection unit 843 of placer and router 870 is configured to select among the candidate locations a target location with an associated valuation that satisfies a predetermined criterion, and the node assignment unit 845 of placer and router 870 is configured to assign the current node to the target location.

For example, after having evaluated the placement of the current node in each one of the predetermined number of suitable candidate locations, the placer and router 870 may assign the current node to the candidate location with the best valuation, which may be the lowest cost or the greatest benefit, for example.

The edge assignment unit 845 of placer and router 870 is configured to assign edges that connect the current node with already assigned nodes of the ordered sequence of nodes to physical links and switches of the reconfigurable processor. For example, the routing tool of placer and router 870 may route the connections between the current node in the candidate location with the best valuation and all other already placed nodes with which the current node shares an edge in the operation unit graph on the reconfigurable processor (e.g., by assigning configurable interconnection resources and/or by programming configurable switches).

As an example, consider the scenario in which placer and router 870 performs an iterative placement and routing of the operation unit graph 700 of FIG. 7 on a reconfigurable processor. As mentioned above, the operation unit graph 700 may include nodes WBUF 710, B 712, WBUF 714, AB0 716, WBUF 717, OUT0 718, and AB1 719 that may illustratively be associated with a memory unit on a reconfigurable processor such as PMU 510 of FIG. 5 and nodes PCU1 720, PCU0 722, BIAS 724, PCU1 726, and PCU0 728 that may illustratively be associated with a compute unit on a reconfigurable processor such as PCU 520 of FIG. 5.

The reconfigurable processor may include a CGR array similar to CGR array 400 of FIG. 4 having ten FCMUs (e.g., FCMUs 530 as shown in FIG. 5) that are arranged in a grid of two rows and five columns. Each FCMU may include a PMU and a PCU (e.g., as shown in FIG. 5).

A grid of switches may be arranged between the FCMUs (e.g., as shown in FIG. 4). Channels may interconnect the switches among themselves and the switches with FCMUs. For example, as shown in FIG. 4, channels 421 may interconnect a switch 403 with other switches 403, and channels 422 may interconnect switches 403 with FCMUs 401.

Illustratively, the reconfigurable processor may have the following architectural limitations specified in the architectural specifications:

Every PCU can only receive inputs from the attached PMU or from the switches that are to the northeast (NE) or southeast (SE) of the PCU. Thus, only the southwest (SW) route of a switch or the northwest (NW) route of a switch leads to the adjacent PCU. Every PCU can only send outputs to the switches that are to the northeast (NE) of the PCU.

Every PMU can only receive inputs from the switches that are to the NW or SW of the PMU. Thus, only the SE route of a switch or the NE route of a switch leads to the adjacent PMU. Every PMU can only send outputs to the attached PCU or to the switches that are to the NW or SW of the PMU.

Each switch connects via north (N), east (E), south(S), west (W) connections to other, adjacent switches.

In this scenario, the sorting tool 810 may receive the operation unit graph and generate a sorted operation unit graph having an ordered sequence of nodes and edges that interconnect nodes in the ordered sequence of nodes.

The sorting tool 810 may determine a first node that is the starting point of the sorting. As an example, the first node may be randomly selected among all the nodes of the operation unit graph 805. As another example, the operation unit graph 805 may include a list of all the nodes, and determining the first node may include selecting a node that is at a predetermined position (e.g., the first node, the last node, etc.) in the list. As yet another example, the first node may be determined as being a source node (i.e., a node without fan-in) or a sink node (i.e., a node without fanout) of a longest path between a source and a sink node. As an example, a depth-first search (DFS) or a breadth-first search (BFS) may be used to determine the longest path between a source and a sink node. As another example, Dijkstra's algorithm may be used to determine the longest path between a source and a sink node.

In the example of FIG. 7, the longest paths from source nodes WBU 710, B 712, WBUF 714, and WBUF 717 have a length of six, six, four, and two, respectively.

By way of example, the first node may be determined as being the source node of the longest path. If desired, the first node may be determined as being the sink node of the longest path. In the example of FIG. 7, node WBUF 710 may be determined as being the source node of the longest path.

Starting with the first node, the second node and any subsequent node of the ordered sequence of nodes may be determined by keeping track of a priority queue (e.g., a min priority queue or a max priority queue), and the first node in the queue may be selected as the next node of the sorting tool 810.

In the example of the operation unit graph 700 of FIG. 7, node WBUF 710 may be inserted into the ordered sequence of nodes at the first position in a first operation. In a second operation, all neighbors of node WBUF 710 may be added to the priority queue. For this purpose, the key (or all keys) of PCU0 722 and PCU1 720 may be determined (e.g., based on the bandwidth of the connection of nodes PCU0 722 and PCU1 720 with already sorted node WBUF 710). In a third operation, node PCU0 722 is inserted first into the priority queue followed by node PCU1 720.

In a fourth operation, the node that is first in the priority queue (i.e., node PCU0 722) is popped from the priority queue and inserted into the ordered sequence of nodes. If all nodes have been sorted, the sorting tool 810 stops. Otherwise, the sorting tool 810 returns to the second operation to add the neighbors (i.e., nodes B 612 and AB0 716) of the recently inserted node (i.e., node PCU0 722) to the priority queue.

Once the sorting tool 810 has terminated, the resulting ordered sequence of nodes of the illustrative operation unit graph 700 of FIG. 7 may have the order of WBUF 710, PCU0 722, PCU1 720, B 612, AB0 716, bias 624, WBUF 714, OUT0 718, PCU0 728, PCU1 726, WBUF 717, and AB1 719.

Figure 9A:
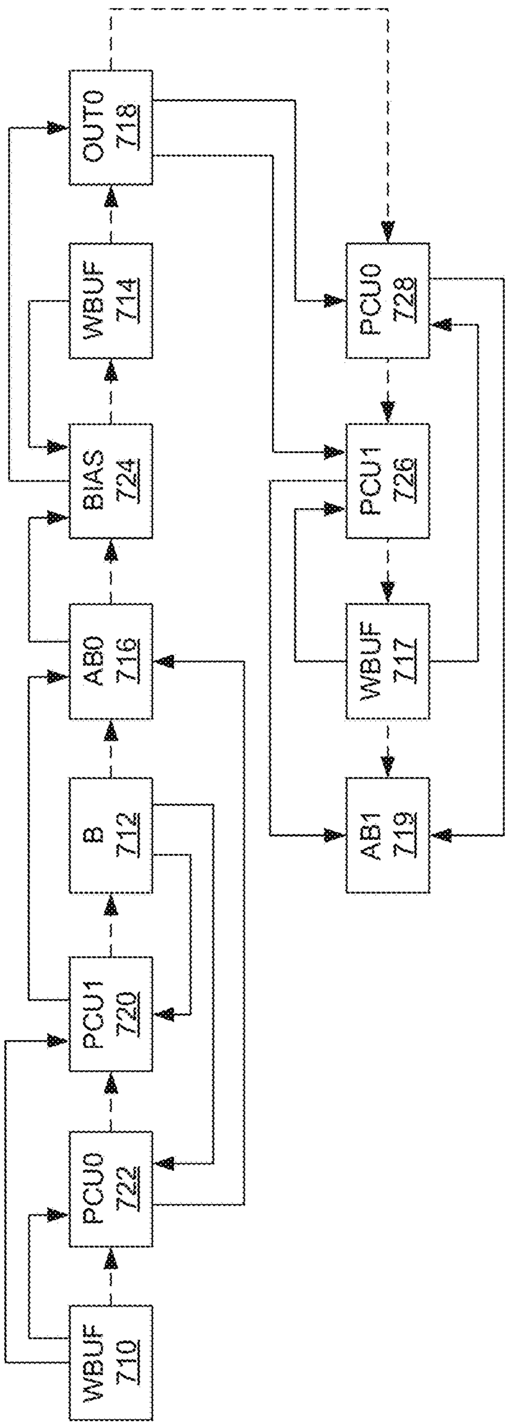
FIG. 9A is a diagram of an illustrative ordered sequence of nodes of the illustrative operation unit graph of FIG. 7.

FIG. 9A is a diagram of an illustrative sorted operation unit graph having an ordered sequence of nodes and edges that interconnect nodes in the ordered sequence of nodes that sorting tool 810 may generate from the illustrative operation unit graph 700 of FIG. 7. The order of the nodes in the ordered sequence of nodes is illustrated using dashed lines while the edges of the operation unit graph 700 are shown in solid lines.

A placer and router such as placer and router 870 of FIG. 8 receives the sorted operation unit graph of FIG. 9A with the ordered sequence of nodes and edges that interconnect the nodes in the ordered sequence of nodes. The placer and router also receives an architectural specification of the reconfigurable processor and performs iterative passes of placement and routing based on the ordered sequence of nodes. As an example, nodes that are earlier in the ordered sequence of nodes may be placed and routed before nodes that are later in the ordered sequence of nodes. As another example, nodes that are later in the ordered sequence of nodes may be placed and routed before nodes that are earlier in the ordered sequence of nodes. In other words, the sorting tool 810 may determine a priority for the placement and routing of the nodes of the operation unit graph.

FIGS. 9B to 9F show illustrative assignments of nodes of the sorted operation unit graph of FIG. 9A to locations on the reconfigurable processor described above and illustrative assignment of the edges of the sorted operation unit graph of FIG. 9A to interconnections resources of the reconfigurable processor described above. Newly assigned edges, that are shown for the first time in a Figure, are shown with thicker arrows than edges that were assigned beforehand and already shown in a previous Figure.

Figure 9B:
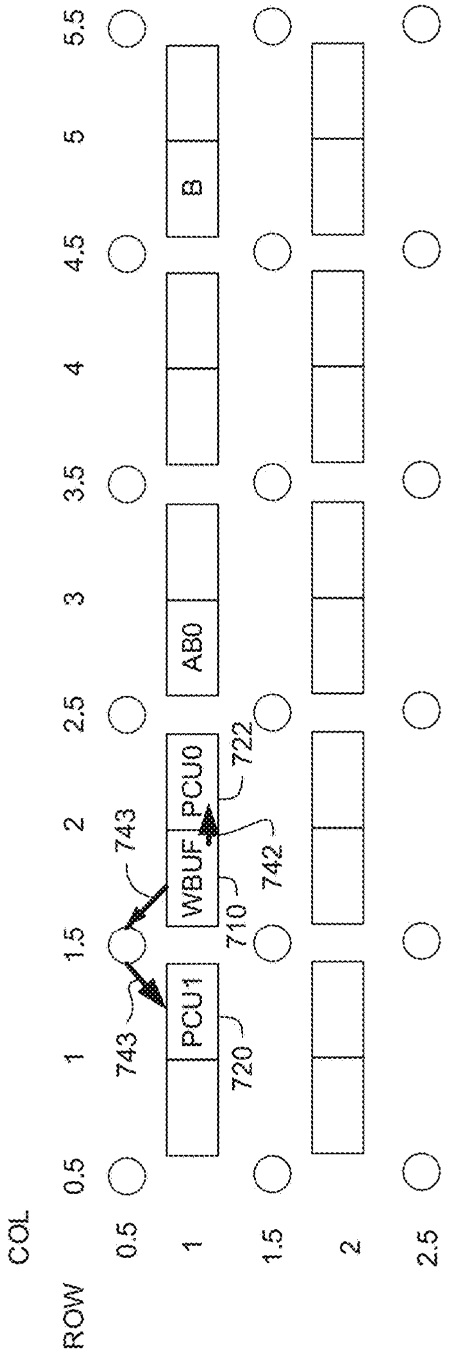
FIG. 9B is a diagram of an illustrative assignment of the first three nodes of the ordered sequence of nodes of FIG. 9A onto a reconfigurable processor.

FIG. 9B is a diagram of an illustrative assignment of the first three nodes of the ordered sequence of nodes of FIG. 9A onto a reconfigurable processor.

In a first iteration, the placer and router may retrieve node WBUF 710 as the first unassigned node from the ordered sequence of nodes. The placer and router may determine the location row 1, column (col) 1, which may be abbreviated as (row 1, col 1) or just (1, 1), as a starting location for performing a search of candidate locations that are suitable for placing the WBUF 710 and determine the four candidate locations (row 1, col 1), (row 1, col 2), (row 2, col 1), and (row 2, col 2) on the reconfigurable processor for placing WBUF 710.

For each candidate location, the placer and router may determine a valuation associated with placing WBUF 710 at the candidate location. For example, WBUF 710 has to be placed at a PMU location on the reconfigurable processor. At the same time, the outputs of WBUF 710 have to be routed to two different PCU locations on the reconfigurable processor. Since a PMU can only send outputs to the attached PCU in the same location or to the switches that are to the NW or SW of the PMU, candidate locations (row 1, col 2) and (row 2, col 2) may receive a better valuation than the two other candidate locations.

For the remainder of this example, the valuation is illustratively based on the number of switches, channels, and local connections weighted by the relative bandwidth requirement that are required for implementing the edges that connect the recently assigned node with previously assign nodes. Note that other valuations may be used instead such as a total Manhattan distance of all interconnection resources of the reconfigurable processor that are required for connecting the current node with the already assigned nodes, a total Manhattan distance of all interconnection resources of the reconfigurable processor that are required for connecting the current node with the already assigned nodes weighted with associated bandwidth requirements, a number of switches required for connecting the current node with the already assigned nodes, a channel usage required for connecting the current node with the already assigned nodes, just to name a few.

Moreover, horizontal channels (i.e., channels between switches that are in the same row, but in different columns) are assumed to have the same valuation as vertical channels (i.e., channels between switches that are in the same column, but in different rows).

Since the relative bandwidth requirement for edges 742 and 743 are both 1.0, placing WBUF 710 in candidate locations (row 1, col 2) and PCU0 722 and PCU1 720 in locations (row 1, col 2) and (row 1, col 1) or WBUF 710 in (row 2, col 2) and PCU0 722 and PCU1 720 in locations (row 1, col 2) and (row 1, col 1) requires the use of one switch, two channels, and one location connection as shown in FIG. 9B. Placing WBUF 710 and PCU0 722 in (row 1, col 1) and PCU1 720 in (row 1, col 2) would require three switches (row 0.5, col 0.5), (row 0.5, col 1.5), (row 0.5, col 2.5), four channels, and one local connection. Placing WBUF 710 and PCU0 722 in (row 1, col 1) and PCU1 720 in (row 2, col 1) would require two switches (row 1.5, col 0.5), (row 1.5, col 1.5), three channels, and one local connection.

Since WBUF 710 is an input node, a candidate location closer to the boundary of the reconfigurable processor may receive a better valuation than a candidate location further to the center of the reconfigurable processor. In the present case, the candidate location (row 1, col 2) receives the best valuation among all the candidate locations for placing WBUF 710. As a result, the placer and router may assign WBUF 710 to location (row 1, col 2) of the reconfigurable processor.

Since there are no other assigned nodes, the placer and router continues with a second iteration. In the second iteration, PCU0 722 may be placed in location (row 1, col 2) of the reconfigurable processor, which requires only one local connection, and the edge 742 that connects PCU0 722 with already placed node WBUF 710 may be routed using the PMU to PCU local connection shown in FIG. 9B.

In a third iteration, PCU1 720 may be placed in location (row 1, col 1) of the reconfigurable processor, and the edge 743 between WBUF 710 and PCU1 720 may be routed on the reconfigurable processor using the NW output port of WBUF 710, the switch at location (0.5, 1.5), and the NE input port of PCU1 720 as shown in FIG. 9B (e.g., by assigning configurable interconnection resources and/or by programming configurable switches).

In some implementations, the nodes WBUF 710, PCU0 722, and PCU1 720 may be considered an important subgraph (e.g., because of the high-bandwidth connections between WBUF 710 and PCU0 722 and PCU1 720. In some implementations, the placer and router may place important subgraphs together during the same iteration.

Figure 9C:
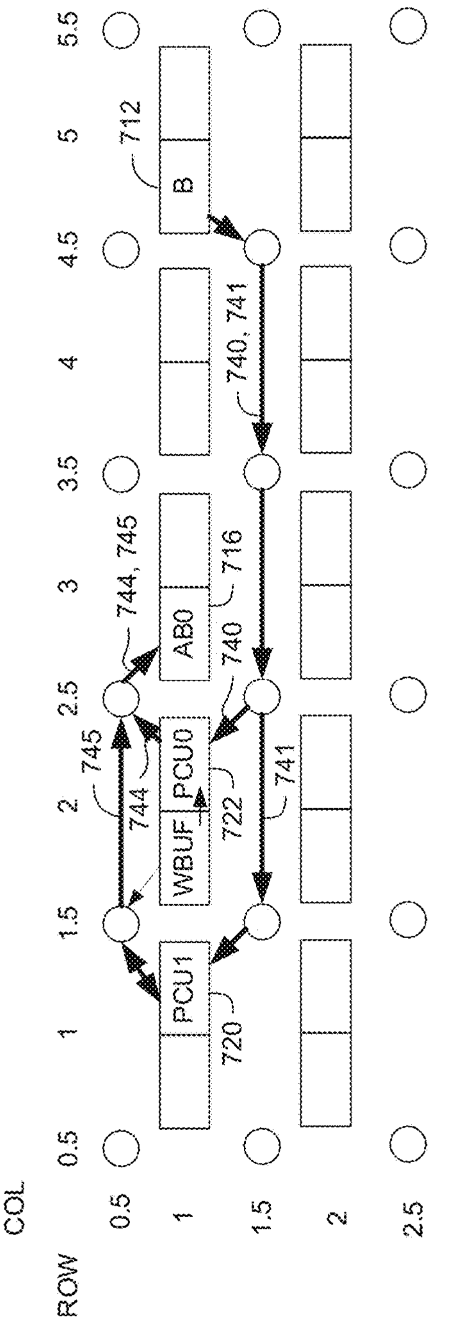
FIG. 9C is a diagram of an illustrative assignment of the first five nodes of the ordered sequence of nodes of FIG. 9A onto a reconfigurable processor.

FIG. 9C is a diagram of an illustrative assignment of the first five nodes of the ordered sequence of nodes of FIG. 9A onto a reconfigurable processor.

In a fourth iteration, node B 712 is retrieved as the first unassigned node from the ordered sequence of nodes. Consider the scenario in which node B 712 is connected to the network via an AGCU at location (row 1, col 6) and that the network connection has a relative bandwidth requirement of 1.0. In this scenario, the placer and router determines location (row 1, col 5) as starting location on the reconfigurable processor for performing a search of candidate locations, and determines candidate locations (row 1, col 5) or (1, 5), (row 1, col 4) or (1, 4), (row 2, col 5) or (2, 5), and (row 2, col 4) or (2, 4). The valuation associated with placing the node B 712 at the different candidate locations is determined using the number of switches, channels and local connections weighted by the relative bandwidth requirement. Thus, the candidate location (1, 5) has a valuation of 5.5 switches (switches at (0.5, 5.5), (0.5, 4.5), (1.5, 4.5), (1.5, 3.5), (1.5, 2.5) weighted with 1.0 and switch at (1.5, 1.5) weighted with 0.5) 7.5 channels, and 0 local connections. The candidate location (1, 4) has the same valuation of 5.5 switches, 7.5 channels, and 0 local connections, whereas the candidate locations (2, 4), and (2, 5) have a valuation of 6.5 switches, 8.5 channels, and 0 local connections.

Since B 712 is an input node, a candidate location closer to the boundary of the reconfigurable processor may receive a better valuation than a candidate location further to the center of the reconfigurable processor. In the present case, the candidate location (1, 5) receives the best valuation among all the candidate locations for placing B 712. As a result, the placer and router may assign B 712 to location (row 1, col 5) of the reconfigurable processor. In a next operation, the connections 740, 741 between B 712 and PCU0 722 and PCU1 720 are routed on the reconfigurable processor using the SW port of B 712, the switches at locations (1.5, 4.5), (1.5, 3.5), (1.5, 2.5), and (1.5, 1.5), and the SE input ports of PCU0 722 and PCU1 720, respectively.

In a fifth iteration, AB0 716, which is now the first unassigned node in the ordered sequence of nodes, is retrieved from the ordered sequence of nodes. The placer and router may determine location (1, 2) as the starting location for performing a search of candidate locations. The PMU of location (1, 2) has already been assigned and is no longer available as a candidate location for placing node AB0 716. Thus, the placer and router may determine locations (1, 1), (1, 3), (2, 1), (2, 2), and (2, 3) as candidate locations. Given the restrictions of the architectural specifications, locations (2, 2) and (1, 3) may have the same valuation of 1.5 switches and 2.5 channels.

The placer and router may select between two candidate locations that have the same valuation in different ways, if desired. As an example, the placer and router may prefer candidate locations that are in the same row rather than in different rows as locations of already assigned neighboring nodes. As another example, the placer and router may prefer candidate locations that are in the same column rather than in different columns as locations of already assigned neighboring nodes. As yet another example, the placer and router may randomly choose one candidate location over other candidate locations with the same valuation. In the present example, the placer and router may select location (1, 3) as the candidate location with the best valuation and assign node AB0 716 to location (1, 3) of the reconfigurable processor.

After the assignment of node AB0 716 to location (1, 3), the connection 745 from PCU1 720 to AB0 716 may be routed on the reconfigurable processor using the NE output port of PCU1 720, the switch at location (0.5, 1.5), the switch at location (0.5, 2.5) and the NW input port of AB0 716, whereas the connection 744 from PCU0 722 to AB0 716 may be routed on the reconfigurable processor using the NE output port of PCU0 722, the switch at location (0.5, 2.5) and the NW input port of AB0 716. Note, that connection 744 and 745 use the same channel between the switch at location (0.5, 2.5) and the NW input port of AB0 716.

Figure 9D:
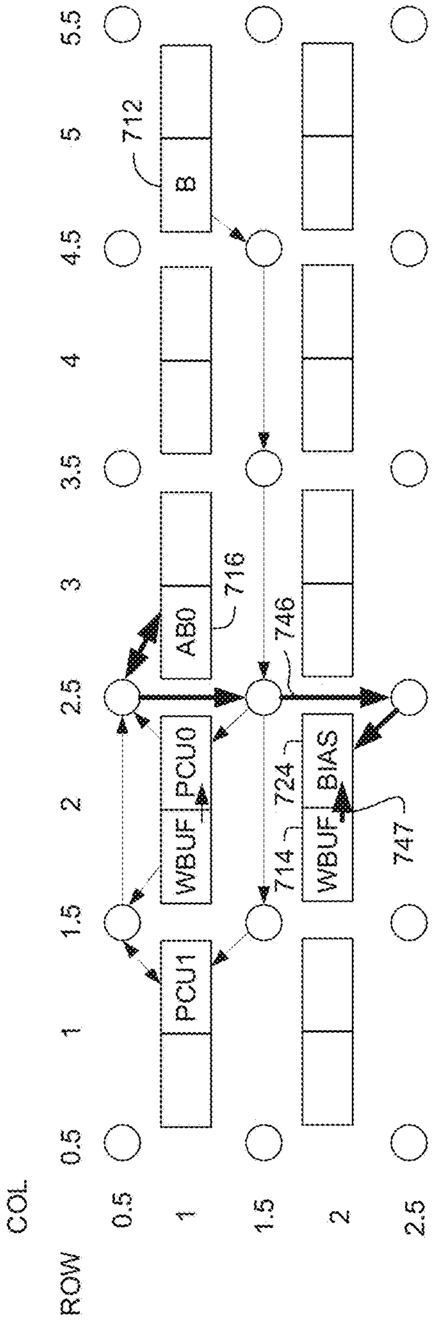
FIG. 9D is a diagram of an illustrative assignment of the first seven nodes of the ordered sequence of nodes of FIG. 9A onto a reconfigurable processor.

FIG. 9D is a diagram of an illustrative assignment of the first seven nodes of the ordered sequence of nodes of FIG. 9A onto a reconfigurable processor. In a sixth iteration, placer and router retrieves node BIAS 724 as first unassigned node from the ordered sequence of nodes. Since node BIAS 724 has a high bandwidth requirement connection with OUT0 718, the placer and router may take the connections of OUT0 718 into consideration when selecting a target location for node BIAS 724. In the present example, the placer and router has selected location (2, 2) as target location for node BIAS 724 and assign edge 746 as shown in FIG. 9D. Similarly, the placer and router may assign node WBUF 714, which is the next unassigned node in the ordered sequence of nodes, to location (2, 2), and assign the edge 747 to the local connection between the PMU and the PCU.

Figure 9E:
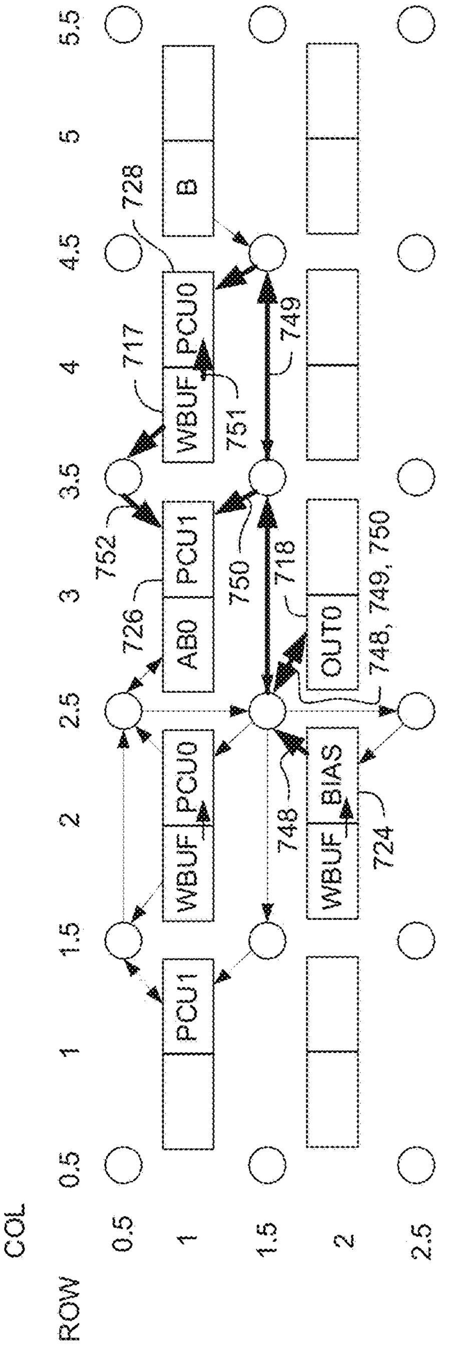
FIG. 9E is a diagram of an illustrative assignment of the first eleven nodes of the ordered sequence of nodes of FIG. 9A onto a reconfigurable processor.

FIG. 9E is a diagram of an illustrative assignment of the first eleven nodes of the ordered sequence of nodes of FIG. 9A onto a reconfigurable processor. In fact, nodes OUT0 718, PCU0 728, PCU1 726, WBUF 717 may be placed in that order at locations (2, 3), (1, 4), and (1, 3), respectively, and the connections with previously placed nodes are routed as shown in FIG. 9E.

Figure 9F:
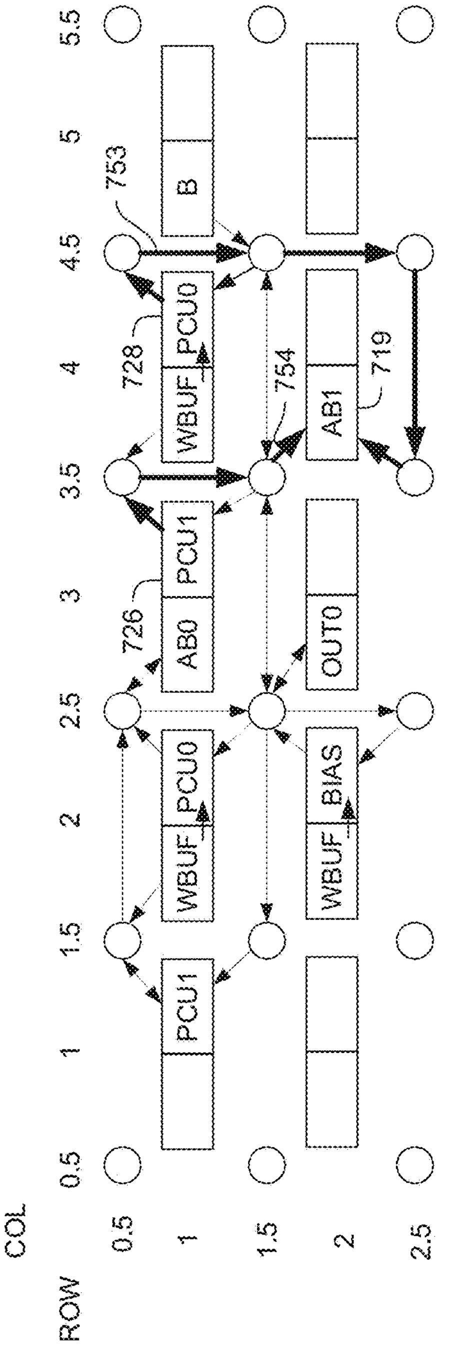
FIG. 9F is a diagram of an illustrative assignment of all twelve nodes of the ordered sequence of nodes of FIG. 9A onto a reconfigurable processor.
Figure 10:
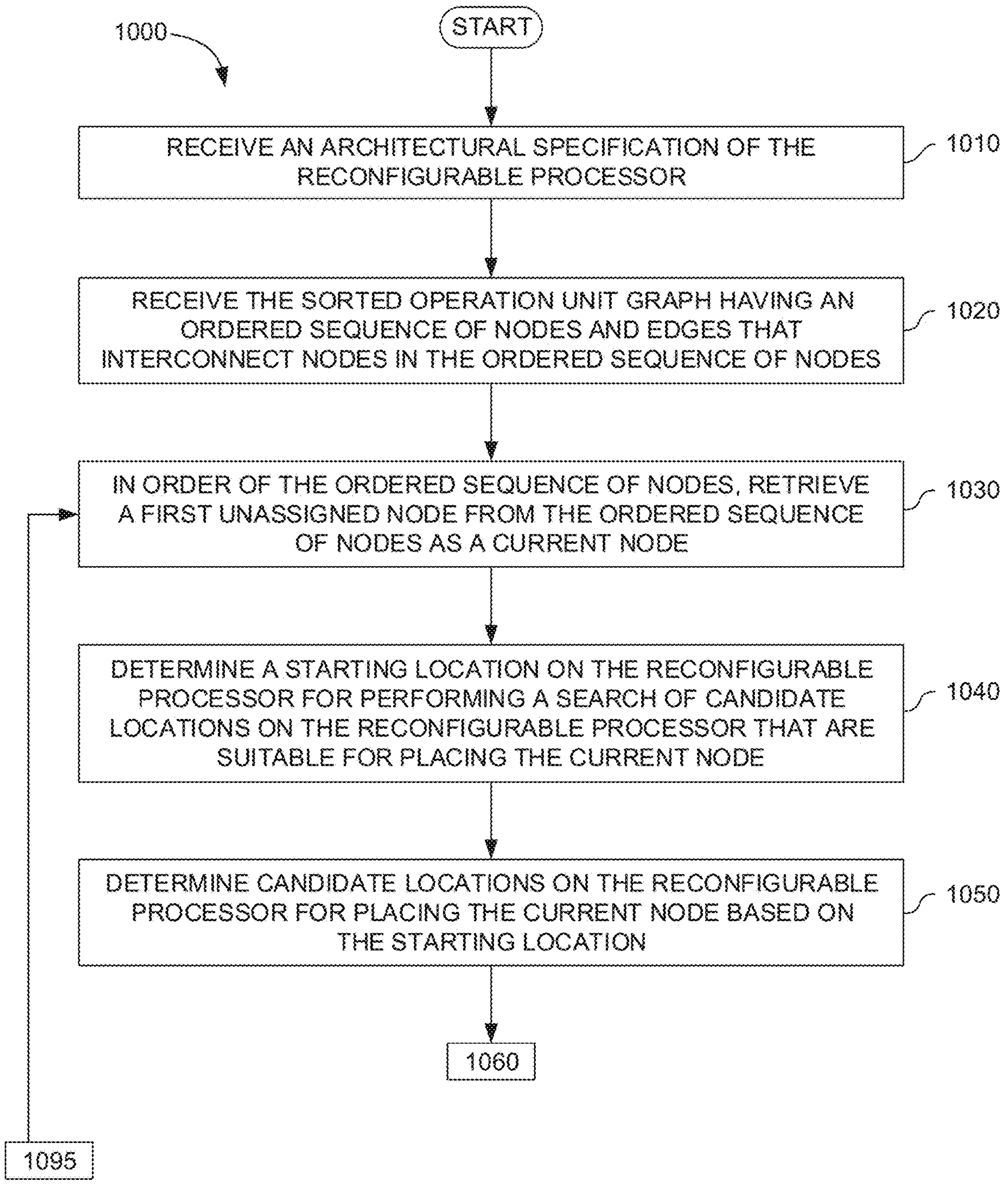
FIG. 10 is a flowchart showing illustrative operations that a placer and router performs for an iterative placement and routing of a sorted operation unit graph on a reconfigurable processor.
Figure 10:
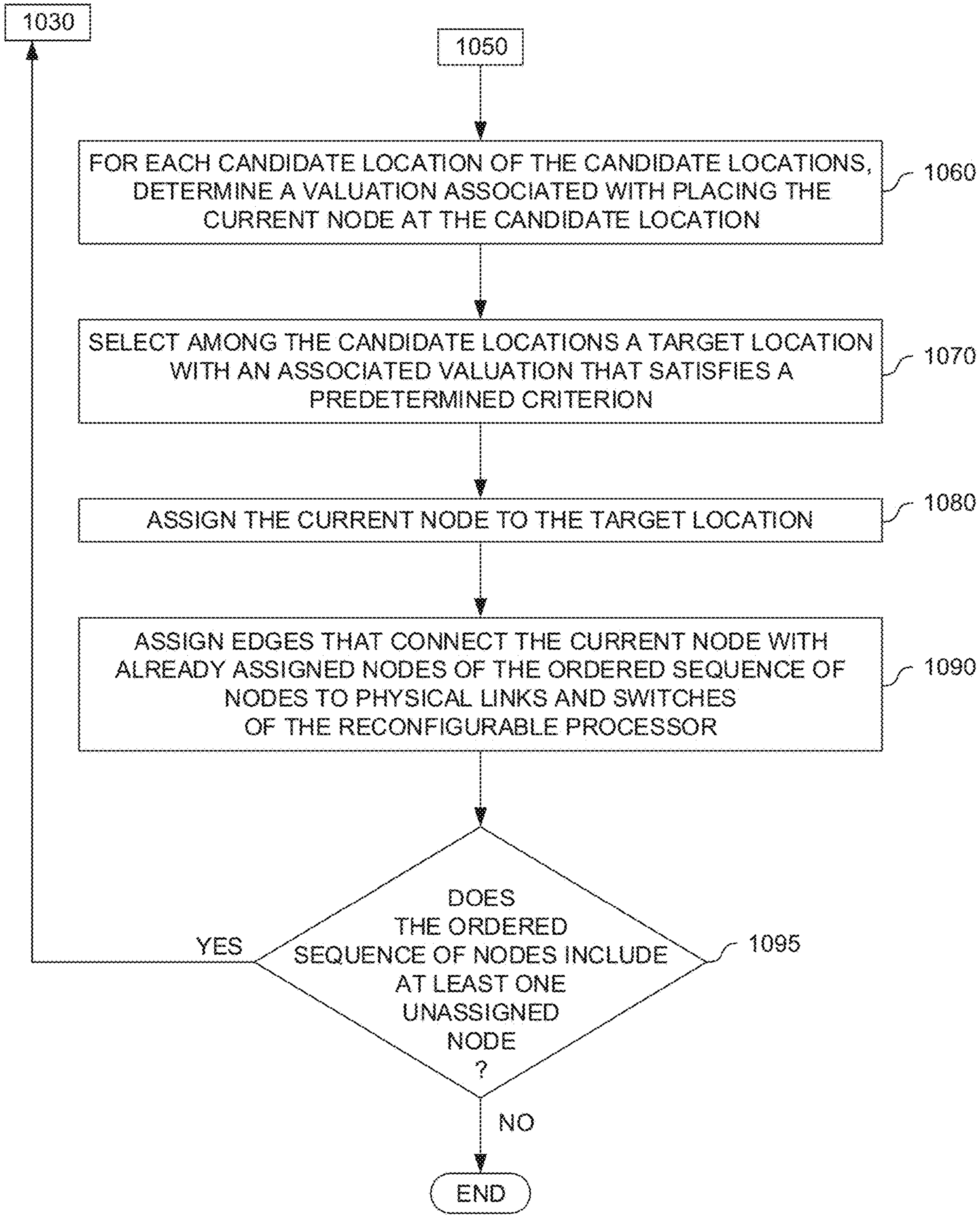

Finally, node AB1 719 may be placed at location (2, 4), and the connections 753 and 754 with previously placed nodes PCU0 728 and PCU1 726 routed as shown in FIG. 9F, which shows an illustrative assignment of all twelve nodes of the ordered sequence of nodes of FIG. 9A onto a reconfigurable processor FIG. 10 is a flowchart 1000 showing illustrative operations that a placer and router such as placer and router 870 of FIG. 8, performs for an iterative placement and routing of a sorted operation unit graph on a reconfigurable processor. Such a reconfigurable processor may include arrays of coarse-grained reconfigurable (CGR) units. In some implementations, the reconfigurable processor may be CGR processor 110 of FIG. 1.

During operation 1010, the placer and router receives an architectural specification of the reconfigurable processor. For example, the placer and router 870 of FIG. 8 may receive architectural specification 860. The architectural specifications may include the locations of computational units such as PCUs and memory units such as PMUs, the location, capacity, and connectivity of switches and channels including routing limitations such as every PCU may only receive inputs from the attached PMU or from the switches that are to the northeast (NE) or southeast (SE) of the PCU, or every PCU can only send outputs to the switches that are to the northeast (NE) of the PCU, or every PMU can only receive inputs from the switches that are to the NW or SW of the PMU, or every PMU can only send outputs to the attached PCU or to the switches that are to the NW or SW of the PMU, etc.

During operation 1020, the placer and router receives the sorted operation unit graph having an ordered sequence of nodes and edges that interconnect nodes in the ordered sequence of nodes. For example, the placer and router may receive the sorted operation unit graph of FIG. 9A, which has an ordered sequence of nodes and edges that interconnect nodes in the ordered sequence of nodes.

During operation 1030, the placer and router retrieves, in order of the ordered sequence of nodes, a first unassigned node from the ordered sequence of nodes as a current node. For example, after having assigned node WBUF 710 of the sorted operation unit graph to location (1, 2), the placer and router may retrieve node PCU0 722 as the first unassigned nodes from the ordered sequence of nodes of FIG. 9A.

During operation 1040, the placer and router determines a starting location on the reconfigurable processor for performing a search of candidate locations on the reconfigurable processor that are suitable for placing the current node. As an example, the placer and router may determine a location of a most recently assigned node of the already assigned nodes as the starting location on the reconfigurable processor. As another example, the placer and router may determine a location of one of the already assigned nodes as the starting location on the reconfigurable processor, whereby an edge with a highest bandwidth requirement connects the current node with the one of the already assigned nodes. As yet another example, the placer and router may determine a location with a minimum gravitational pull that the current node experiences through connections with the already assigned nodes as the starting location on the reconfigurable processor, wherein connections with a higher bandwidth requirement exert a higher attraction force than connections with a lower bandwidth requirement.

During operation 1050, the placer and router determines candidate locations on the reconfigurable processor for placing the current node based on the starting location. For example, the placer and router may determine a predetermined number of suitable candidate locations as the candidate locations by searching, starting from the starting location and with increasing distance to the starting location. A suitable candidate location of the predetermined number of suitable candidate locations includes circuitry that is unassigned and able to implement the current node.

In some implementations, for determining a predetermined number of suitable candidate locations as the candidate locations by searching starting from the starting location and with increasing distance to the starting location, the placer and router may move from the starting location in direction of a location of an already assigned node of the already assigned nodes, whereby the already assigned node has a connection with a highest bandwidth requirement with the current node among all connections that the current node has with the already assigned nodes. In other implementations, for determining a predetermined number of suitable candidate locations as the candidate locations by searching starting from the starting location and with increasing distance to the starting location, the placer and router may iteratively move with increasing distance from the starting location in a same row, a same column, and diagonally.

During operation 1060, the placer and router determines a valuation associated with placing the current node at the candidate location for each candidate location of the candidate locations. In some implementations, determining the valuation may include determining a weighted sum of two or more criteria associated with placing the current node at the candidate location. In other implementations, determining the valuation associated with placing the current node at the candidate location may include determining a first criterion associated with placing the current node at the candidate location, and determining a second criterion associated with placing the current node at the candidate location for breaking ties between two candidate locations of the candidate locations that have a same first criterion.

For example, the placer and router may determine the valuation based on interconnection resources of the reconfigurable processor that are required for connecting the current node with the already assigned nodes. As an example, such a valuation based on interconnection resources of the reconfigurable processor that are required for connecting the current node with the already assigned nodes may include determining a total Manhattan distance of all interconnection resources of the reconfigurable processor that are required for connecting the current node with the already assigned nodes. As another example, such valuation may include determining a total Manhattan distance of all interconnection resources of the reconfigurable processor that are required for connecting the current node with the already assigned nodes weighted with associated bandwidth requirements. As yet another example, the valuation may include determining a number of switches required for connecting the current node with the already assigned nodes. As yet another example, the valuation may include determining a channel usage required for connecting the current node with the already assigned nodes.

During operation 1070, the placer and router selects among the candidate locations a target location with an associated valuation that satisfies a predetermined criterion. For example, the placer and router may select the candidate location with the lowest cost or the highest benefit as target location. If desired, the placer and router may evaluate feasibility criteria before or after selecting the candidate location with the lowest cost of the highest benefit. For example, the placer and router may evaluate congestion at the target location, whether the circuitry at the target location can implement the current node-to-be-placed, etc.

In some implementations, the placer and router may determine whether the current node is a critical node. For example, the current node may be a critical node if an edge with a relative bandwidth requirement above a predetermined threshold connects the current node with an already assigned node of the already assigned nodes. As another example, the current node may be a critical node if the current node has more than a predetermined number of neighbor nodes. For determining whether the current node is a critical node, the placer and router may determine whether an edge with a relative bandwidth requirement above a predetermined threshold connects the current node with an already assigned node of the already assigned nodes, or the placer and router may determine whether the current node has more than a predetermined number of neighboring nodes.

In some implementations, in response to determining that the current node is a critical node, the placer and router may determine a first predetermined number of candidate locations on the reconfigurable processor for placing the current node based on the starting location, and, for each one of the first predetermined number of candidate locations, determine a second predetermined number of candidate locations on the reconfigurable processor for placing unplaced neighbors of the current node.

In other implementations, in response to determining that the current node is a critical node, the placer and router may determine a first predetermined number of candidate locations on the reconfigurable processor for placing the current node based on the starting location, and in response to determining that the current node is not a critical node determine a second predetermined number of candidate locations on the reconfigurable processor for placing the current node based on the starting location, wherein the second predetermined number of candidate locations is smaller than the first predetermined number of candidate locations.

During operation 1080, the placer and router assigns the current node to the target location, and during operation 1090, the placer and router assigns edges that connect the current node with already assigned nodes of the ordered sequence of nodes to physical links and switches of the reconfigurable processor.

During operation 1095, the placer and router may determine whether the ordered sequence of nodes includes at least one unassigned node. In response to determining that the ordered sequence of nodes includes at least one unassigned node, the placer and router returns to operation 1030. Otherwise, the placer and router terminates.

If desired, a non-transitory computer-readable storage medium includes instructions that, when executed by a processing unit (e.g., host processor 180 of FIG. 1), cause the processing unit to operate a placer and router (e.g., placer and router 625 of FIG. 6 or the placer and router 870 of FIG.

8) for an iterative placement and routing of a sorted operation unit graph on a reconfigurable processor by performing operations 1010 to 1080 of FIG. 10.

The instructions may include receiving an architectural specification of the reconfigurable processor, receiving the sorted operation unit graph having an ordered sequence of nodes and edges that interconnect nodes in the ordered sequence of nodes, and repeating as long as the ordered sequence of nodes comprises at least one unassigned node: in order of the ordered sequence of nodes, retrieving a first unassigned node from the ordered sequence of nodes as a current node, determining a starting location on the reconfigurable processor for performing a search of candidate locations on the reconfigurable processor that are suitable for placing the current node, determining candidate locations on the reconfigurable processor for placing the current node based on the starting location, for each candidate location of the candidate locations, determining a valuation associated with placing the current node at the candidate location, selecting among the candidate locations a target location with an associated valuation that satisfies a predetermined criterion, assigning the current node to the target location, and assigning edges that connect the current node with already assigned nodes of the ordered sequence of nodes to physical links and switches of the reconfigurable processor.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a method of operating a placer and router for an iterative placement and routing of a sorted operation unit graph on a reconfigurable processor, comprising: receiving an architectural specification of the reconfigurable processor; receiving the sorted operation unit graph having an ordered sequence of nodes and edges that interconnect nodes in the ordered sequence of nodes; repeating as long as the ordered sequence of nodes comprises at least one unassigned node: in order of the ordered sequence of nodes, retrieving a first unassigned node from the ordered sequence of nodes as a current node; determining a starting location on the reconfigurable processor for performing a search of candidate locations on the reconfigurable processor that are suitable for placing the current node; determining candidate locations on the reconfigurable processor for placing the current node based on the starting location; for each candidate location of the candidate locations, determining a valuation associated with placing the current node at the candidate location; selecting among the candidate locations a target location with an associated valuation that satisfies a predetermined criterion; assigning the current node to the target location; and assigning edges that connect the current node with already assigned nodes of the ordered sequence of nodes to physical links and switches of the reconfigurable processor.

In Example 2, the reconfigurable processor of Example 1 comprises arrays of coarse-grained reconfigurable (CGR) units.

In Example 3, determining a starting location on the reconfigurable processor of Example 1 further comprises: determining a location of a most recently assigned node of the already assigned nodes as the starting location on the reconfigurable processor; determining a location of one of the already assigned nodes as the starting location on the reconfigurable processor, wherein an edge with a highest bandwidth requirement connects the current node with the one of the already assigned nodes; or determining a location with a minimum gravitational pull that the current node experiences through connections with the already assigned nodes as the starting location on the reconfigurable processor, wherein connections with a higher bandwidth requirement exert a higher attraction force than connections with a lower bandwidth requirement.

In Example 4, determining candidate locations on the reconfigurable processor for placing the current node based on the starting location of Example 1 further comprises determining a predetermined number of suitable candidate locations as the candidate locations by searching starting from the starting location and with increasing distance to the starting location, wherein a suitable candidate location of the predetermined number of suitable candidate locations includes circuitry that is unassigned and able to implement the current node.

In Example 5, determining a predetermined number of suitable candidate locations as the candidate locations by searching starting from the starting location and with increasing distance to the starting location of Example 4 further comprises moving from the starting location in direction of a location of an already assigned node of the already assigned nodes, wherein the already assigned node has a connection with a highest bandwidth requirement with the current node among all connections that the current node has with the already assigned nodes.

In Example 6, determining a predetermined number of suitable candidate locations as the candidate locations of Example 4 by searching starting from the starting location and with increasing distance to the starting location further comprises iteratively moving with increasing distance from the starting location in a same row, a same column, and diagonally.

In Example 7, determining the valuation associated with placing the current node at the candidate location of Example 1 further comprises determining the valuation based on interconnection resources of the reconfigurable processor that are required for connecting the current node with the already assigned nodes.

In Example 8, determining the valuation based on interconnection resources of the reconfigurable processor that are required for connecting the current node with the already assigned nodes of Example 7 further comprises: determining a total Manhattan distance of all interconnection resources of the reconfigurable processor that are required for connecting the current node with the already assigned nodes; determining a total Manhattan distance of all interconnection resources of the reconfigurable processor that are required for connecting the current node with the already assigned nodes weighted with associated bandwidth requirements; determining a number of switches required for connecting the current node with the already assigned nodes; or determining a channel usage required for connecting the current node with the already assigned nodes.

In Example 9, determining the valuation associated with placing the current node at the candidate location of Example 1 further comprises determining a weighted sum of two or more criteria associated with placing the current node at the candidate location.

In Example 10, determining the valuation associated with placing the current node at the candidate location of Example 1 further comprises: determining a first criterion associated with placing the current node at the candidate location; and determining a second criterion associated with placing the current node at the candidate location for breaking ties between two candidate locations of the candidate locations that have a same first criterion.

In Example 11, the method of Example 1 further comprises determining whether the current node is a critical node.

In Example 12, the method of Example 11 further comprises in response to determining that the current node is a critical node: determining a first predetermined number of candidate locations on the reconfigurable processor for placing the current node based on the starting location; and for each one of the first predetermined number of candidate locations, determining a second predetermined number of candidate locations on the reconfigurable processor for placing unplaced neighbors of the current node.

In Example 13, the method of Example 11 further comprises in response to determining that the current node is a critical node: determining a first predetermined number of candidate locations on the reconfigurable processor for placing the current node based on the starting location; and in response to determining that the current node is not a critical node: determining a second predetermined number of candidate locations on the reconfigurable processor for placing the current node based on the starting location, wherein the second predetermined number of candidate locations is smaller than the first predetermined number of candidate locations.

In Example 14, determining whether the current node is a critical node of Example 11 further comprises: determining whether an edge with a relative bandwidth requirement above a predetermined threshold connects the current node with an already assigned node of the already assigned nodes, or determining whether the current node has more than a predetermined number of neighbor nodes.

Example 15 is a placer and router for an iterative placement and routing of a sorted operation unit graph on a reconfigurable processor, wherein the placer and router is configured to: receive an architectural specification of the reconfigurable processor; receive the sorted operation unit graph having an ordered sequence of nodes and edges that interconnect nodes in the ordered sequence of nodes; repeat as long as the ordered sequence of nodes comprises at least one unassigned node: in order of the ordered sequence of nodes, retrieve a first unassigned node from the ordered sequence of nodes as a current node; determine a starting location on the reconfigurable processor for performing a search of candidate locations on the reconfigurable processor that are suitable for placing the current node; determine candidate locations on the reconfigurable processor for placing the current node based on the starting location; for each candidate location of the candidate locations, determine a valuation associated with placing the current node at the candidate location; select among the candidate locations a target location with an associated valuation that satisfies a predetermined criterion; assign the current node to the target location; and assign edges that connect the current node with already assigned nodes of the ordered sequence of nodes to physical links and switches of the reconfigurable processor.

In Example 16, the placer and router of Example 15, for determining a starting location on the reconfigurable processor, is further configured to: determine a location of a most recently assigned node of the already assigned nodes as the starting location on the reconfigurable processor; determine a location of one of the already assigned nodes as the starting location on the reconfigurable processor, wherein an edge with a highest bandwidth requirement connects the current node with the one of the already assigned nodes; or determine a location with a minimum gravitational pull that the current node experiences through connections with the already assigned nodes as the starting location on the reconfigurable processor, wherein connections with a higher bandwidth requirement exert a higher attraction force than connections with a lower bandwidth requirement.

In Example 17, the placer and router of Example 15, for determining candidate locations on the reconfigurable processor for placing the current node based on the starting location, is further configured to determine a predetermined number of suitable candidate locations as the candidate locations by searching starting from the starting location and with increasing distance to the starting location, wherein a suitable candidate location of the predetermined number of suitable candidate locations includes circuitry that is unassigned and able to implement the current node.

In Example 18, the placer and router of Example 15, for determining the valuation associated with placing the current node at the candidate location, is further configured to determine the valuation based on interconnection resources of the reconfigurable processor that are required for connecting the current node with the already assigned nodes.

In Example 19, the placer and router of Example 18, for determining the valuation based on interconnection resources of the reconfigurable processor that are required for connecting the current node with the already assigned nodes, is further configured to: determine a total Manhattan distance of all interconnection resources of the reconfigurable processor that are required for connecting the current node with the already assigned nodes; determine a total Manhattan distance of all interconnection resources of the reconfigurable processor that are required for connecting the current node with the already assigned nodes weighted with associated bandwidth requirements; determine a number of switches required for connecting the current node with the already assigned nodes; or determine a channel usage required for connecting the current node with the already assigned nodes.

Example 20 is a non-transitory computer-readable storage medium including instructions that, when executed by a processing unit, cause the processing unit to operate a placer and router for an iterative placement and routing of a sorted operation unit graph on a reconfigurable processor, the instructions comprising: receiving an architectural specification of the reconfigurable processor; receiving the sorted operation unit graph having an ordered sequence of nodes and edges that interconnect nodes in the ordered sequence of nodes; repeating as long as the ordered sequence of nodes comprises at least one unassigned node: in order of the ordered sequence of nodes, retrieving a first unassigned node from the ordered sequence of nodes as a current node; determining a starting location on the reconfigurable processor for performing a search of candidate locations on the reconfigurable processor that are suitable for placing the current node; determining candidate locations on the reconfigurable processor for placing the current node based on the starting location; for each candidate location of the candidate locations, determining a valuation associated with placing the current node at the candidate location; selecting among the candidate locations a target location with an associated valuation that satisfies a predetermined criterion; assigning the current node to the target location; and assigning edges that connect the current node with already assigned nodes of the ordered sequence of nodes to physical links and switches of the reconfigurable processor.

What is claimed is:

1. A method of operating a placer and router for an iterative placement and routing of a sorted operation unit graph on a reconfigurable processor, comprising:

receiving an architectural specification of the reconfigurable processor;

receiving the sorted operation unit graph having an ordered sequence of nodes and edges that interconnect nodes in the ordered sequence of nodes;

repeating as long as the ordered sequence of nodes comprises at least one unassigned node:

in order of the ordered sequence of nodes, retrieving a first unassigned node from the ordered sequence of nodes as a current node;

determining a starting location on the reconfigurable processor for performing a search of locations on the reconfigurable processor that are suitable for placing the current node;

determining whether the current node is a critical node, wherein determining whether the current node is a critical node comprises determining whether an edge with a relative bandwidth requirement above a predetermined threshold connects the current node with an already assigned node of the ordered sequence of nodes;

in response to determining that the current node is a critical node, determining a first predetermined number of candidate locations on the reconfigurable processor as the candidate locations for placing the current node based on the starting location;

in response to determining that the current node is not a critical node, determining a second predetermined number of candidate locations on the reconfigurable processor as the candidate locations for placing the current node based on the starting location, wherein the second predetermined number of candidate locations is smaller than the first predetermined number of candidate locations;

for each candidate location of the candidate locations, determining a valuation associated with placing the current node at the candidate location;

selecting among the candidate locations a target location with an associated valuation that satisfies a predetermined criterion;

assigning the current node to the target location; and assigning edges that connect the current node with already assigned nodes of the ordered sequence of nodes to one or more of physical links and switches of the reconfigurable processor.

2. The method of claim 1, wherein the reconfigurable processor comprises arrays of coarse-grained reconfigurable (CGR) units.

3. The method of claim 1, wherein determining the starting location on the reconfigurable processor further comprises:

determining the location of a most recently assigned node of the already assigned nodes as the starting location on the reconfigurable processor;

determining a location of one of the already assigned nodes as the starting location on the reconfigurable processor, wherein an edge with a highest bandwidth requirement connects the current node with the one of the already assigned nodes; or determining a location with a minimum gravitational pull that the current node experiences through connections with the already assigned nodes as the starting location on the reconfigurable processor, wherein connections with a higher bandwidth requirement exert a higher attraction force than connections with a lower bandwidth requirement.

4. The method of claim 1, wherein determining the candidate locations on the reconfigurable processor for placing the current node based on the starting location further comprises:

determining a predetermined number of suitable candidate locations as the candidate locations by searching starting from the starting location and with increasing distance to the starting location, wherein a suitable candidate location of the predetermined number of suitable candidate locations includes circuitry that is unassigned and able to implement the current node.

5. The method of claim 4, wherein determining the predetermined number of suitable candidate locations as the candidate locations by searching starting from the starting location and with increasing distance to the starting location further comprises:

moving from the starting location in direction of a location of an already assigned node of the already assigned nodes, wherein the already assigned node has a connection with a highest bandwidth requirement with the current node among all connections that the current node has with the already assigned nodes.

6. The method of claim 4, wherein determining the predetermined number of suitable candidate locations as the candidate locations by searching starting from the starting location and with increasing distance to the starting location further comprises:

iteratively moving with increasing distance from the starting location in a same row, a same column, and diagonally.

7. The method of claim 1, wherein determining the valuation associated with placing the current node at the candidate location further comprises:

determining the valuation based on interconnection resources of the reconfigurable processor that are required for connecting the current node with the already assigned nodes.

8. The method of claim 7, wherein determining the valuation based on interconnection resources of the reconfigurable processor that are required for connecting the current node with the already assigned nodes further comprises:

determining a total Manhattan distance of all interconnection resources of the reconfigurable processor that are required for connecting the current node with the already assigned nodes;

determining a total Manhattan distance of all interconnection resources of the reconfigurable processor that are required for connecting the current node with the already assigned nodes weighted with associated bandwidth requirements;

determining a number of switches required for connecting the current node with the already assigned nodes; or determining a channel usage required for connecting the current node with the already assigned nodes.

9. The method of claim 1, wherein determining the valuation associated with placing the current node at the candidate location further comprises:

determining a weighted sum of two or more criteria associated with placing the current node at the candidate location.

10. The method of claim 1, wherein determining the valuation associated with placing the current node at the candidate location further comprises:

determining a first criterion associated with placing the current node at the candidate location; and determining a second criterion associated with placing the current node at the candidate location for breaking ties between two candidate locations of the candidate locations that have a same first criterion.

11. The method of claim 1, further comprising:

in response to determining that the current node is the critical node:

for each one of the first predetermined number of candidate locations, determining a third predetermined number of candidate locations on the reconfigurable processor for placing unplaced neighbors of the current node.

12. The method of claim 1, wherein determining whether the current node is a critical node further comprises:

determining whether the current node has more than a predetermined number of neighbor nodes.

13. A placer and router for an iterative placement and routing of a sorted operation unit graph on a reconfigurable processor, the placer and router comprising at least one processor configured to:

receive an architectural specification of the reconfigurable processor;

receive the sorted operation unit graph having an ordered sequence of nodes and edges that interconnect nodes in the ordered sequence of nodes;

repeat as long as the ordered sequence of nodes comprises at least one unassigned node:

in order of the ordered sequence of nodes, retrieve a first unassigned node from the ordered sequence of nodes as a current node;

determine a starting location on the reconfigurable processor for performing a search of locations on the reconfigurable processor that are suitable for placing the current node;

determine whether the current node is a critical node, wherein determining whether the current node is a critical node comprises determining whether an edge with a relative bandwidth requirement above a predetermined threshold connects the current node with an already assigned node of the ordered sequence of nodes;

in response to determining that the current node is a critical node, determine a first predetermined number of candidate locations on the reconfigurable processor as the candidate locations for placing the current node based on the starting location;

in response to determining that the current node is not a critical node, determine a second predetermined number of candidate locations on the reconfigurable processor as the candidate locations for placing the current node based on the starting location, wherein the second predetermined number of candidate locations is smaller than the first predetermined number of candidate locations;

for each candidate location of the candidate locations, determine a valuation associated with placing the current node at the candidate location;

select among the candidate locations a target location with an associated valuation that satisfies a predetermined criterion;

assign the current node to the target location; and assign edges that connect the current node with already assigned nodes of the ordered sequence of nodes to one or more of physical links and switches of the reconfigurable processor.

14. The placer and router of claim 13, wherein the placer and router, for determining the starting location on the reconfigurable processor, is further configured to:

determine the location of a most recently assigned node of the already assigned nodes as the starting location on the reconfigurable processor;

determine a location of one of the already assigned nodes as the starting location on the reconfigurable processor, wherein an edge with a highest bandwidth requirement connects the current node with the one of the already assigned nodes; or determine a location with a minimum gravitational pull that the current node experiences through connections with the already assigned nodes as the starting location on the reconfigurable processor, wherein connections with a higher bandwidth requirement exert a higher attraction force than connections with a lower bandwidth requirement.

15. The placer and router of claim 13, wherein the placer and router, for determining the candidate locations on the reconfigurable processor for placing the current node based on the starting location, is further configured to:

determine a predetermined number of suitable candidate locations as the candidate locations by searching starting from the starting location and with increasing distance to the starting location, wherein a suitable candidate location of the predetermined number of suitable candidate locations includes circuitry that is unassigned and able to implement the current node.

16. The placer and router of claim 13, wherein the placer and router, for determining the valuation associated with placing the current node at the candidate location, is further configured to:

determine the valuation based on interconnection resources of the reconfigurable processor that are required for connecting the current node with the already assigned nodes.

17. The placer and router of claim 16, wherein the placer and router, for determining the valuation based on interconnection resources of the reconfigurable processor that are required for connecting the current node with the already assigned nodes, is further configured to:

determine a total Manhattan distance of all interconnection resources of the reconfigurable processor that are required for connecting the current node with the already assigned nodes;

determine a total Manhattan distance of all interconnection resources of the reconfigurable processor that are required for connecting the current node with the already assigned nodes weighted with associated bandwidth requirements;

determine a number of switches required for connecting the current node with the already assigned nodes; or determine a channel usage required for connecting the current node with the already assigned nodes.

18. A non-transitory computer-readable storage medium including instructions that, when executed by a processing unit, cause the processing unit to operate a placer and router for an iterative placement and routing of a sorted operation unit graph on a reconfigurable processor, the instructions comprising:

receiving an architectural specification of the reconfigurable processor;

receiving the sorted operation unit graph having an ordered sequence of nodes and edges that interconnect nodes in the ordered sequence of nodes;

repeating as long as the ordered sequence of nodes comprises at least one unassigned node:

in order of the ordered sequence of nodes, retrieving a first unassigned node from the ordered sequence of nodes as a current node;

determining a starting location on the reconfigurable processor for performing a search of locations on the reconfigurable processor that are suitable for placing the current node;

determining whether the current node is a critical node, wherein determining whether the current node is a critical node comprises determining whether an edge with a relative bandwidth requirement above a predetermined threshold connects the current node with an already assigned node of the ordered sequence of nodes;

in response to determining that the current node is a critical node, determining a first predetermined number of candidate locations on the reconfigurable processor as the candidate locations for placing the current node based on the starting location;

in response to determining that the current node is not a critical node, determining a second predetermined number of candidate locations on the reconfigurable processor as the candidate locations for placing the current node based on the starting location, wherein the second predetermined number of candidate locations is smaller than the first predetermined number of candidate locations;

for each candidate location of the candidate locations, determining a valuation associated with placing the current node at the candidate location;

selecting among the candidate locations a target location with an associated valuation that satisfies a predetermined criterion;

assigning the current node to the target location; and assigning edges that connect the current node with already assigned nodes of the ordered sequence of nodes to physical links and switches of the reconfigurable processor.

* * * * *